(12) United States Patent
Owen et al.

(10) Patent No.: US 7,069,361 B2
(45) Date of Patent: Jun. 27, 2006

(54) SYSTEM AND METHOD OF MAINTAINING COHERENCY IN A DISTRIBUTED COMMUNICATION SYSTEM

(75) Inventors: Jonathan M. Owen, Northboro, MA (US); Mark D. Hummel, Franklin, MA (US); Derrick R. Meyer, Austin, TX (US); James B. Keller, Palo Alto, CA (US)

(73) Assignees: Advanced Micro Devices, Inc., Sunnyvale, CA (US); API NetWorks, Inc., Concord, MA (US)

( * ) Notice: Subject to any disclaimer, the term of this patent is extended or adjusted under 35 U.S.C. 154(b) by 1018 days.

(21) Appl. No.: 09/840,449

(22) Filed: Apr. 23, 2001

(65) Prior Publication Data

US 2002/0174229 A1 Nov. 21, 2002

Related U.S. Application Data

(63) Continuation of application No. 09/826,262, filed on Apr. 4, 2001.

(51) Int. Cl.
*G06F 13/00* (2006.01)

(52) U.S. Cl. .................. 710/107; 710/306; 711/141

(58) Field of Classification Search .............. 710/36, 710/100, 107, 306; 711/121, 130, 146, 154, 711/169, 217, 140–141; 712/28–29; 709/200, 709/238

See application file for complete search history.

(56) References Cited

U.S. PATENT DOCUMENTS

| | | | |
|---|---|---|---|
| 5,897,657 A * | 4/1999 | Hagersten et al. .......... 711/145 |
| 5,961,621 A * | 10/1999 | Wu et al. .................... 710/107 |
| 6,101,420 A | 8/2000 | Van Doren et al. |
| 6,108,752 A | 8/2000 | Van Doren et al. |
| 6,167,492 A | 12/2000 | Keller et al. |
| 6,209,065 B1 | 3/2001 | Van Doren et al. |
| 6,249,846 B1 | 6/2001 | Van Doren et al. |
| 6,275,905 B1 | 8/2001 | Keller et al. |
| 6,370,621 B1 | 4/2002 | Keller |
| 6,389,526 B1 | 5/2002 | Keller et al. |
| 6,393,529 B1 | 5/2002 | Keller |
| 6,473,849 B1 | 10/2002 | Keller et al. |
| 6,490,661 B1 | 12/2002 | Keller et al. |
| 6,529,999 B1 | 3/2003 | Keller et al. |
| 6,553,430 B1 | 4/2003 | Keller |
| 6,557,048 B1 | 4/2003 | Keller et al. |
| 6,631,401 B1 | 10/2003 | Keller et al. |
| 6,631,448 B1 * | 10/2003 | Weber ........................ 711/141 |
| 6,714,994 B1 | 3/2004 | Keller et al. |
| 6,721,813 B1 * | 4/2004 | Owen et al. .................... 710/6 |
| 2003/0095557 A1 | 5/2003 | Keller et al. |

OTHER PUBLICATIONS

U.S. Appl. No. 09/640,602, filed Aug. 17, 2000, Owen et al.

* cited by examiner

*Primary Examiner*—Khanh Dang
(74) *Attorney, Agent, or Firm*—Meyertons Hood Kivlin Kowert & Goetzel, P.C.; B. Noël Kivlin

(57) ABSTRACT

A method and system of expediting issuance of a second request of a pair of ordered requests into a distributed coherent communication fabric. The first request of the ordered pair is issued into the coherent communication fabric and directed to a first target. Issuance of the second request into the coherent communication fabric is stalled until the first target receives and orders the first request and transmits a response acknowledging the same.

43 Claims, 19 Drawing Sheets

| Bit Time | 7 | 6 | 5 | 4 | 3 | 2 | 1 | 0 |
|---|---|---|---|---|---|---|---|---|
| 0 | | | CMD[5:0] | | | | | |
| 1 | | | | | | | | |
| 2 | | | | | | | | |
| 3 | | | | | | | | |

| Bit Time | 7 | 6 | 5 | 4 | 3 | 2 | 1 | 0 |
|---|---|---|---|---|---|---|---|---|
| 0 | Src Unit [1:0] | | CMD[5:0] | | | | | |
| 1 | DestNode[2:0] | | | Dest Unit[1:0] | | SrcNode[2:0] | | |
| 2 | | | | SrcTag[4:0] | | | | |
| 3 | | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | Src Unit [1:0] | | CMD[5:0] | | | | | |
| 1 | DestNode[2:0] | | | Dest Unit[1:0] | | SrcNode[2:0] | | |
| 2 | | | SrcTag[4:0] | | | | | |
| 3 | | | | | | | | |

| Bit Time | 7 | 6 | 5 | 4 | 3 | 2 | 1 | 0 |
|---|---|---|---|---|---|---|---|---|
| 0 | Data[7:0] | | | | | | | |
| 1 | Data[15:8] | | | | | | | |
| 2 | Data[23:16] | | | | | | | |
| 3 | Data[31:24] | | | | | | | |
| 4 | Data[39:32] | | | | | | | |
| 5 | Data[47:40] | | | | | | | |
| 6 | Data[55:48] | | | | | | | |
| 7 | Data[63:56] | | | | | | | |

| CMD Code | VChan | Command | Packet Type |
|---|---|---|---|
| 000000 | - | Nop | Info |
| 000001 | NPR | VicBlk | Request/Address/Data |
| 000010 | - | Reserved | - |
| 000011 | NPR | ValidateBlk | Request/Address |
| 000100 | NPR | RdBlk | Request/Address |
| 000101 | NPR | RdBlkS | Request/Address |
| 000110 | NPR | RdBlkMod | Request/Address |
| 000111 | NPR | ChangeToDirty | Request/Address |
| x01xxx | NPR or PR | Wr(Sized) | Request/Address/Data |
| 01xxxx | NPR | Read(Sized) | Request/Address |
| 100xxx | - | Reserved | - |
| 110000 | R | RdResponse | Response/Data |
| 110001 | R | ProbeResp | Response |
| 110010 | R | TgtStart | Response |
| 110011 | R | TgtDone | Response |
| 110100 | R | SrcDone | Response |
| 110101 | R | MemCancel | Response |
| 11011x | - | Reserved | - |
| 11100x | P | Probe | Request/Address |
| 11101x | P | Broadcast | Request/Address |
| 11110x | - | Reserved | - |
| 111110 | - | Reserved | - |
| 111111 | - | Sync | Info |

| Bit Time | 7 | 6 | 5 | 4 | 3 | 2 | 1 | 0 |
|---|---|---|---|---|---|---|---|---|
| 0 | SeqID[3:2] | | CMD[5:0] | | | | | |
| 1 | Pass PW | SeqID[1:0] | | UnitID[4:0] | | | | |
| 2 | | | | SrcTag[4:0] | | | | |
| 3 | Addr[7:2] | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | | | | CMD[5:0] | | | | |
| 1 | Pass PW | Bridge | | | UnitID[4:0] | | | |
| 2 | | | Error | SrcTag[4:0] | | | | |
| 3 | | | NXA | | | | | |

FIG. 9

| CMD Code | VChan | Command | Packet Type |
|---|---|---|---|
| 000000 | - | Nop | Info |
| 000001 | - | Reserved | - |
| 000010 | NPR | Flush | Request |
| 000011 | - | Reserved | - |
| 0001xx | - | Reserved | - |
| x01xxx | NPR or PR | Wr(Sized) | Request/Address/Data |
| 01xxxx | NPR | Read(Sized) | Request/Address |
| 100xxx | - | Reserved | - |
| 110000 | R | RdResponse | Response/Data |
| 110001 | - | Reserved | - |
| 110010 | - | Reserved | - |
| 110011 | R | TgtDone | Response |
| 11010x | - | Reserved | - |
| 11011x | - | Reserved | - |
| 11100x | - | Reserved | - |
| 11101x | PR or NPR | Broadcast | Request/Address |
| 111100 | PR | Fence | Request |
| 111101 | - | Reserved | - |
| 111110 | - | Reserved | - |
| 111111 | - | Sync | Info |

| Request₁ TYPE | Request₂ TYPE | WAIT REQUIREMENTS |
|---|---|---|
| MEMORY WRITE | MEMORY WRITE | 1. Req$_2$ MUST WAIT FOR TgtStart$_1$.<br>2. SrcDone$_2$ MUST WAIT FOR TgtDone$_1$.<br>3. TgtDone$_2$ ON THE NON-COHERENT LINK (IF REQUIRED) MUST WAIT FOR TgtDone$_1$. |
| MEMORY WRITE | MEMORY READ | 1. Req$_2$ MUST WAIT FOR TgtStart$_1$.<br>2. TgtDone$_2$ ON THE NON-COHERENT LINK MUST WAIT FOR TgtDone$_1$. |
| MEMORY READ | MEMORY REQUEST | Req$_2$ MUST WAIT FOR TgtStart$_1$. |
| MEMORY WRITE | I/O REQUEST OR INTERRUPT | Req$_2$ MUST WAIT FOR TgtStart$_1$. |
| MEMORY READ | I/O REQUEST | Req$_2$ MUST WAIT FOR TgtStart$_1$. |
| MEMORY WRITE | FLUSH | TgtDone$_2$ ON THE NON-COHERENT LINK MUST WAIT FOR TgtDone$_1$. (FLUSH DOES NOT CAUSE ANY REQUESTS TO BE ISSUED TO THE COHERENT FABRIC.) |
| MEMORY READ | FLUSH OR INTERRUPT | NO WAIT REQUIREMENTS |
| MEMORY WRITE | RESPONSE | Response$_2$ MUST WAIT FOR TgtDone$_1$. |
| MEMORY READ | RESPONSE | Response$_2$ MUST WAIT FOR TgtStart$_1$. |
| I/O REQUEST | MEMORY REQUEST | Req$_2$ MUST WAIT FOR TgtStart$_1$. |
| I/O REQUEST | I/O REQUEST OR INTERRUPT | Req$_2$ MUST WAIT FOR TgtStart$_1$. |
| I/O REQUEST | FLUSH | TgtDone$_2$ ON THE NON-COHERENT LINK MUST WAIT FOR TgtStart$_1$. (FLUSH DOES NOT CAUSE ANY REQUESTS TO BE ISSUED TO THE COHERENT FABRIC.) |
| I/O REQUEST | RESPONSE | Response$_2$ MUST WAIT FOR TgtStart$_1$. |
| FLUSH | ANYTHING | NO WAIT REQUIREMENTS |
| RESPONSE | ANYTHING | NO WAIT REQUIREMENTS |
| FIXED/NON VECTORED INTERRUPT | RESPONSE | Response$_2$ MUST WAIT FOR ALL BROADCAST MESSAGE RESPONSES TO BE RECEIVED. |
| FIXED/NON VECTORED INTERRUPT | ANYTHING BUT RESPONSE | NO WAIT REQUIREMENTS |
| LPA INTERRUPT | ANYTHING | NO WAIT REQUIREMENTS |
| SysMgt | ANYTHING | NO WAIT REQUIREMENTS |
| FENCE | POSTED REQUEST | Req$_2$ MUST WAIT FOR FENCE TO BE RETIRED. |
| FENCE | ANYTHING NONPOSTED | NO WAIT REQUIREMENTS |
| POSTED MEMORY WRITE | FENCE | Req$_2$ MAY BE RETIRED WHEN TgtDone$_1$. |
| POSTED I/O WRITE | FENCE | Req$_2$ MAY BE RETIRED WHEN TgtStart$_1$. |
| ANYTHING NONPOSTED | FENCE | NO WAIT REQUIREMENTS |

| Bit Time | 7 | 6 | 5 | 4 | 3 | 2 | 1 | 0 |
|---|---|---|---|---|---|---|---|---|
| 0 | SrcUnit[1:0] | | | Cmd[5:0] | | | | |
| 1 | TgtNode[2:0] | | | TgtUnit[1:0] | | SrcNode[2:0] | | |
| 2 | MD | Rsv | | SrcTag[4:0] | | | | |
| 3 | Addr[7:3] | | | | | NextState[1:0] | | RD |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| NextState[1:0] | Next State |
|---|---|
| 0 | No Change |
| 1 | Shared : Clean-> Shared Dirty->Shared/Dirty |
| 2 | Invalid |
| 3 | Rsv |

| Transaction Class | Probe Request | Next State | Memory Data | Return Data | Probe Response Tgt |
|---|---|---|---|---|---|
| RdSized (no lock, or locked by different requester) | Probe/Src | No change | 1 | 1 | SrcNode/SrcUnit |
| RdSized (locked by requester) | Probe/Src | Shared | 1 | 1 | SrcNode/SrcUnit |
| RdBlk, RdBlkS | Probe/Src | Shared | 1 | 1 | SrcNode/SrcUnit |
| RdBlkMod | Probe/Src | Invalid | 1 | 1 | SrcNode/SrcUnit |
| ChangeToDirty | Probe/Src | Invalid | 0 | 1 | SrcNode/SrcUnit |
| ValidateBlk | Probe/Src | Invalid | 0 | 0 | SrcNode/SrcUnit |
| WrSized | Probe/Tgt | Invalid | 0 | 1 (0 is optional for 16 doubleword writes) | TgtNode/TgtUnit |
| VicBlk | No Probes Sent | - | - | - | - |

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | DestNode[2:0] | | | DestUnit[1:0] | | SrcNode[2:0] | | |
| 2 | Rsv | | Error | SrcTag[4:0] | | | | |
| 3 | Shared | Rsv | | | | | | |

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | DestNode[2:0] | | | DestUnit[1:0] | | SrcNode[2:0] | | |
| 2 | Count[1:0] | | Error | SrcTag[4:0] | | | | |
| 3 | Shared | Probe | Rsv | | | Cancel | Count[3:2] | |

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | DestNode[2:0] | | | DestUnit[1:0] | | SrcNode[2:0] | | |
| 2 | Rsv | | Error | SrcTag[4:0] | | | | |
| 3 | Rsv | | | | | Cancel/Rsv | Rsv | |

FIG. 17

SYSTEM AND METHOD OF MAINTAINING COHERENCY IN A DISTRIBUTED COMMUNICATION SYSTEM

This application is a Continuation of application Ser. No. 09/826,262 filed Apr. 4, 2001.

BACKGROUND OF THE INVENTIONS

1. Field of the Invention

This invention is related to the field of computer systems and, more particularly, to increasing bandwidth for issuing ordered transaction into a distributed processing system.

2. Background of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, the multiple devices attached to the shared bus present a relatively large electrical capacitance to devices driving signals on the bus. In addition, the multiple attach points on the shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced.

On the other hand, distributed communication systems lack many of the above disadvantages. A distributed communication system includes multiple nodes interconnected by multiple independent communication links. The distributed communication system thus may include many different paths via which communication traffic among the nodes may travel, and traffic may pass through intermediate nodes enroute to a final destination. The distributed communication system also may include a distributed memory having multiple portions, each of which is located at a particular node. A memory address space of the computer system is assigned across the memories portions at each node.

In general, a "node" is a device which is capable of participating in transactions upon the interconnect. For example, the interconnect may be packet based, and the node may be configured to receive and transmit packets as part of a transaction. Generally speaking, a transaction is a series of packets. A "requester" or "source" node initiates a transaction directed to a "target" node by issuing a request packet. Each packet which is part of the transaction is communicated between two nodes, with the receiving node being designated as the "destination" of the individual packet. When a packet ultimately reaches the target node, the target node accepts the information conveyed by the packet and processes the information internally. Alternatively, a node located on a communication path between the requester and target nodes may relay the packet from the requester node to the target node.

In addition to the original request packet, the transaction may result in the issuance of other types of packets, such as responses, probes, and broadcasts, each of which is directed to a particular destination. For example, upon receipt of the original request packet, the target node may issue broadcast or probe packets to other nodes in the processing system. These nodes, in turn, may generate responses, which may be directed to either the target node or the requester node. If directed to the target node, the target node may respond by issuing a response back to the requester node.

Distributed communication systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g. for coherency purposes). On the other hand, in distributed communication systems, nodes may initiate transactions concurrently and use the interconnect to transmit the transactions to other nodes. These transactions may have logical conflicts between them (e.g. coherency conflicts for transactions involving the same address) and may experience resource conflicts (e.g. buffer space may not be available in various nodes) because no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

Another challenge presented by a distributed communication system involves control of the ordering of transactions directed to memory. Because transactions directed to a target may travel different paths, there is no assurance that a particular transaction will reach the target prior to a subsequently issued transaction. Uncertainty or ambiguity with respect to transaction ordering may be problematic in certain systems in which memory requests (e.g., read and write transactions) may need to be properly ordered with respect to other pending memory operations to preserve memory coherency within the computer system and/or to satisfy ordering requirements expected by I/O subsystems (e.g., PCI). For example, memory operations may need to be completed in the order in which they were generated. It would thus be desirable to provide a computer system implementing a system and method to control and ensure proper ordering of transactions in a distributed communication system.

Maintaining ordering of transactions can create lengthy delays between the time a first transaction is issued and the time a second transaction may be safely issued without disturbing ordering. For example, to ensure that ordering is maintained with respect to two transactions, the second transaction may be stalled until a previously issued first transaction has completed. It would thus be desirable to increase the bandwidth for ordered transactions by providing a system and method which delays issuance of the second transaction for only as long as needed to ensure that the second transaction will be properly ordered with respect to the second transaction.

The present invention may be directed to one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a method of issuing a pair of ordered requests into a communication fabric which comprises a plurality of nodes interconnected by a plurality of point-to-point links. The method comprises issuing, by a source, the first request into the fabric, the first request being directed to a first node. The first node receives the first requests and issues a first response directed to the source, acknowledging receipt of the first request. In response to receipt of the first response, the source issues the second request into the communication fabric.

BRIEF DESCRIPTION OF THE DRAWINGS

The foregoing and other advantages of the invention will become apparent upon reading the following detailed description and upon reference to the drawings in which:

FIG. 3 is a diagram of an exemplary coherent information packet which may be employed within the processing subsystem;

FIG. 4 is a diagram of an exemplary coherent request packet which may be employed within the processing subsystem;

FIG. 5 is a diagram of an exemplary coherent response packet which may be employed within the processing subsystem;

FIG. 6 is a diagram of an exemplary coherent data packet which may be employed within the processing subsystem;

FIG. 7 is a table listing different types of coherent packets which may be employed within the processing subsystem;

FIG. 8 is a diagram of an exemplary non-coherent request packet which may be employed within the I/O subsystem;

FIG. 9 is a diagram of an exemplary non-coherent response packet which may be employed within the I/O subsystem;

FIG. 10 is a table listing different types of non-coherent packets which may be employed within the I/O subsystem;

FIG. 11 is a table listing ordering rules which may be implemented by the host bridge regarding transactions originating within the I/O subsystem and entering the processing subsystem;

FIG. 12 is an exemplary format of a Probe packet which may be used in various transactions issued in computer system 10;

FIG. 13 is a table illustrating exemplary encodings for the Next State filed of the Probe packet of FIG. 12;

FIG. 14 is a table illustrating various type of Probe packets which may be issued in particular types of transactions;

FIG. 15 is an exemplary format of a Probe response packet which may be issued in response to the Probe packet of FIG. 12;

FIG. 16 is an exemplary format of a Read response packet which may be issued in response to the Probe packet of FIG. 12;

FIG. 17 is an exemplary format of another type of response packet which may be used for other types of responses which are issued during particular transactions;

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
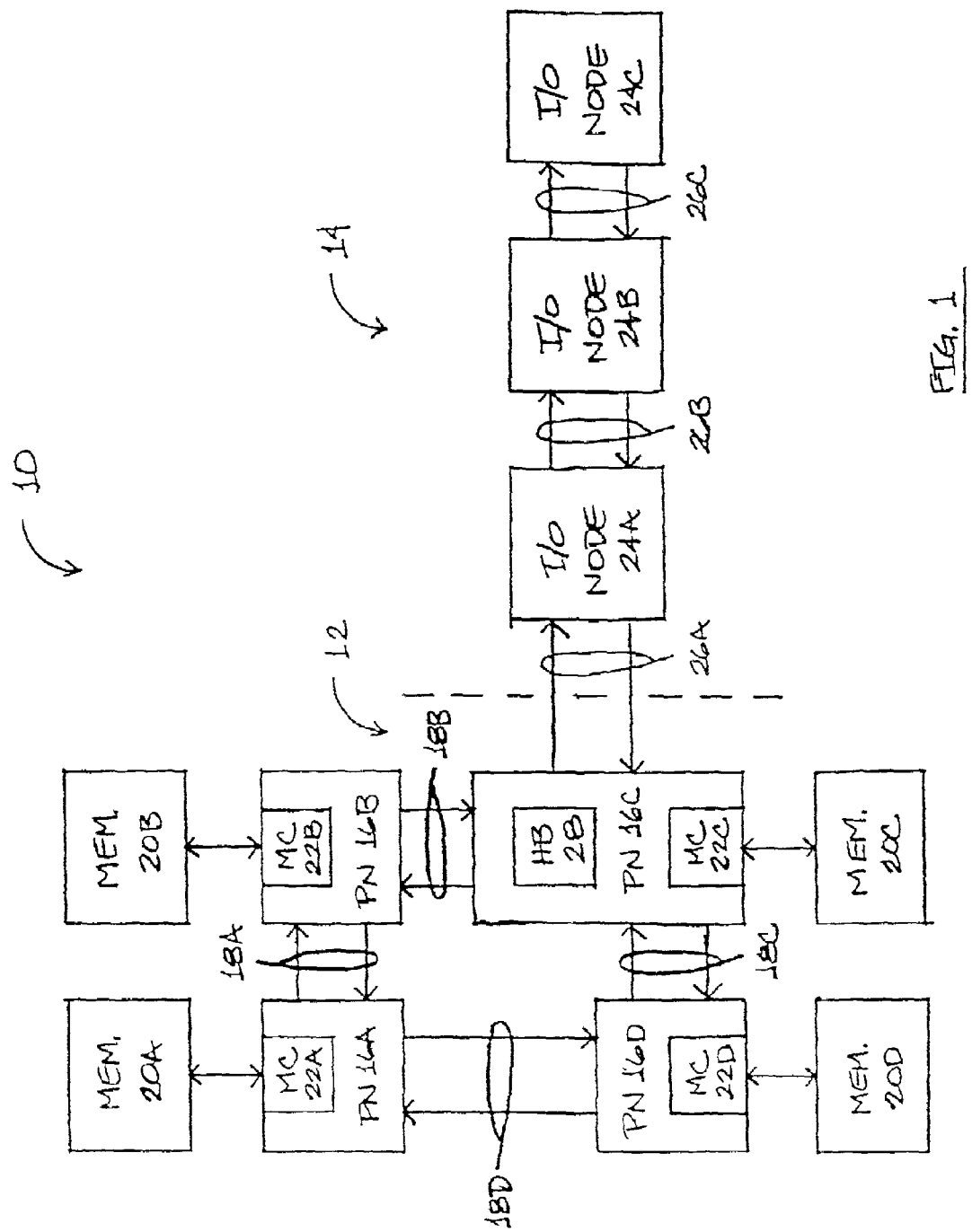
FIG. 1 is a block diagram of one embodiment of a computer system including a processing subsystem and an input/output (I/O) subsystem, wherein the processing subsystem includes several processing nodes, and wherein one of the processing nodes includes a host bridge.

Turning now to the drawings, and with reference to FIG. 1, a block diagram of a distributed communication system 10 including a processing subsystem 12 and an input/output (I/O) subsystem 14 is shown. Other embodiments of distributed communication system 10 are possible and contemplated, such as multiple processing subsystems connected to one I/O subsystem, multiple I/O subsystems connected to a single processing subsystem, etc. The processing subsystem 12 includes several processing nodes (PN) 16A, 16B, 16C, and 16D. The processing node 16A is coupled to the processing node 16B via a bidirectional communication link 18A. Similarly, the processing node 16B is coupled to the processing node 16C by a bidirectional communication link 18B; the processing node 16C is coupled to the processing node 16D by a bidirectional communication link 18C; and the processing node 16D is coupled to the processing node 16A by a bidirectional communication link 18D. As indicated in FIG. 1 and described in more detail below, each bidirectional communication link 18 within the processing subsystem 12 may include two unidirectional sets of transmission media (e.g., wires, etc.).

Each processing node 16A–16D is coupled to a respective memory 20A–20D via a memory controller (MC) 22A–22D included within each respective processing node 16A–16D. As will be described in more detail below, a memory address space of the computer system 10 is assigned across memories 20A–20D such that the computer system 10 has a distributed memory.

The I/O subsystem 14 includes several I/O nodes 24A, 24B, and 24C. Each I/O node 24 may embody one or more I/O functions (e.g., modem, sound card, etc.). The I/O node 24A is coupled to the processing node 16C via a bidirectional communication link 26A. Similarly, the I/O node 24B is coupled to the I/O node 24A via a bidirectional communication link 26B, and the I/O node 24C is coupled to the I/O node 24B via a bidirectional communication link 26C. The I/O nodes 24A–24C are thus coupled one after another in series or daisy chain fashion. As indicated in FIG. 1 and described in more detail below, each bidirectional communication link 26 within the I/O subsystem 14 may include two unidirectional sets of transmission media (e.g., wires, etc.).

Figure 2:
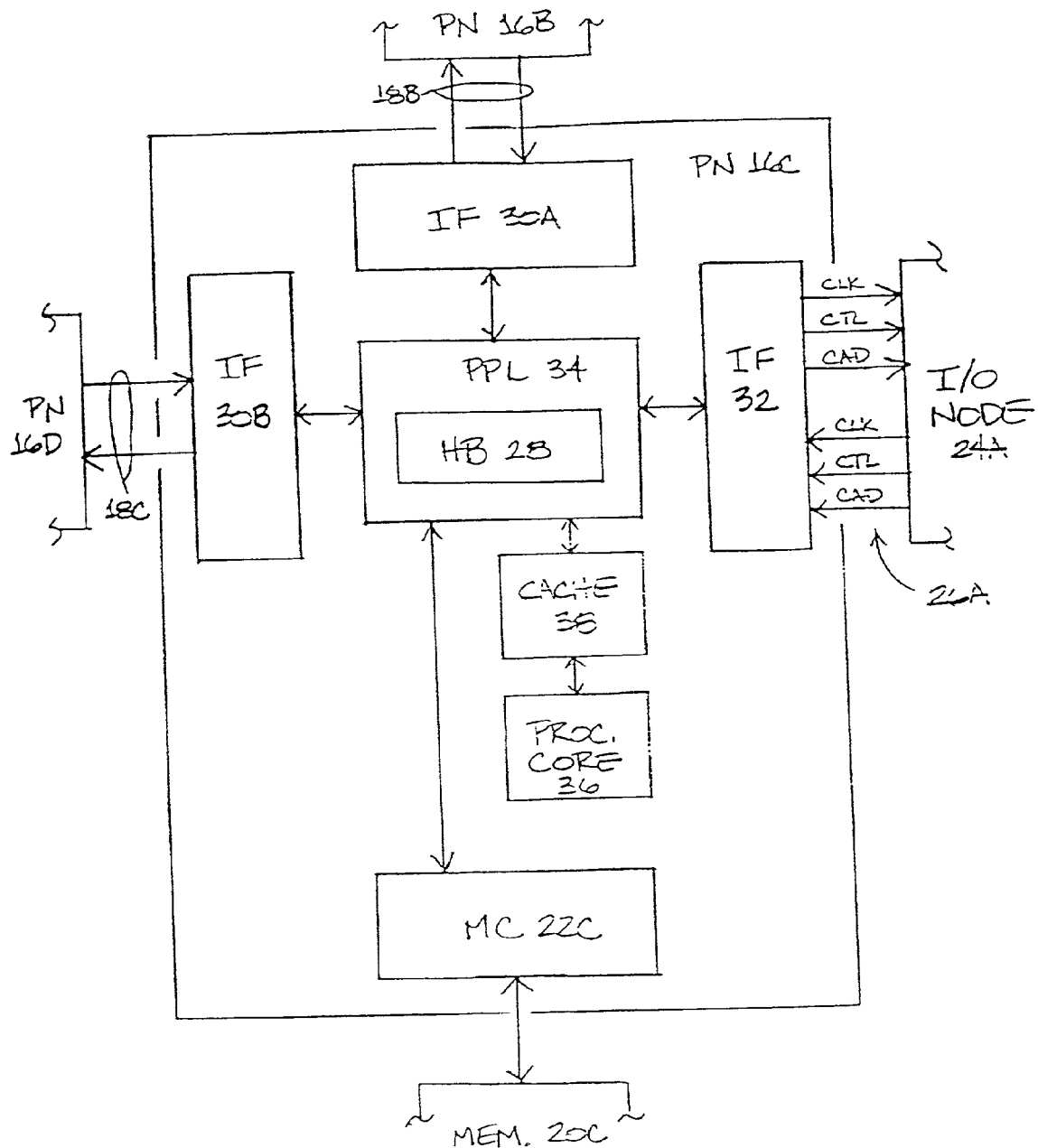
FIG. 2 is a block diagram of one embodiment of the processing node of FIG. 1 including the host bridge.

The processing node 16C includes a host bridge (HB) 28 providing an interface between the I/O subsystem 14 and the processing subsystem 12. FIG. 2 is a block diagram of an exemplary embodiment of the processing node 16C of FIG. 1. In addition to the memory controller 22C, the processing node 16C includes a communication interface (IF) 30A coupled to link 18B, a communication interface 30B coupled to link 18C, and a communication interface 32 coupled to link 26A. The processing node 16C communicates with the processing nodes 16B and 16D via respective interfaces 30A and 30B, and communicates with the I/O node 24A via interface 32. Packet processing logic (PPL) 34 includes the host bridge 28, and is coupled to interface logic 30A, 30B, and 32, and to the memory controller 22C. The processing node 16C also includes a processor core 36 coupled to a cache memory 38. The cache 38 is coupled to a packet processing logic 34.

Generally, the packet processing logic 34 is configured to respond to request packets received on the links to which the processing node 16C is coupled, to generate request packets in response to requests from the cache 38 and/or the processor core 36, to generate Probes and response packets in response to transactions selected by the memory controller 22C for service, to route packets for which node 16C is an intermediate node to another interface logic 30A or 30B for transmission to another processing node, to translate coherent packets received via interface 30A or 30B for routing out interface 32, and to translate non-coherent packets received via interface 32 for routing out interface 30A or 30B. The interface logic 30A, 30B, and 32 may include logic to receive packets and synchronize the packets to the internal clock used by the packet processing logic 34. Further, either the interface logic or the packet processing logic may include buffers for storing packets associated with a particular transaction.

The processor core 36 preferably includes circuitry for executing instructions according to a predefined instruction set. For example, the x86 instruction set architecture may be selected. Alternatively, the ALPHA, POWERPC, or any other instruction set architecture may be selected. Generally, the processor core 36 accesses the cache 38 for instructions and data. If needed instructions and/or data are not present within the cache 38 (i.e., a cache miss is detected), a read request is generated and transmitted to the memory controller within the processing node to which the missing cache block is mapped.

Each processing node 16 in FIG. 1 may include a processor core similar to the processor core 36, a cache similar to the cache 38, packet processing logic similar to the packet processing logic 34 (without the host bridge 28), and interfaces similar to the interfaces 30. Alternatively, each processing node 16 may include packet processing logic 34 with the host bridge 28, and the host bridge 28 in the processing nodes 16A, 16B, and 16D may be idle.

The memories 20A–20D in FIG. 1 may include any suitable memory devices. For example, each memory 20A–D may include one or more RAMBUS DRAMs (RDRAMs), synchronous DRAMs (SDRAMs), static RAM (SRAM), etc. As described above, the address space of the computer system 10 is divided among the memories 20A–20D. Each processing node 16A–16D may include a memory map used to determine which addresses are mapped to each of the memories 20A–20D, and hence to which processing node 16A–16D a memory request for a particular address should be routed.

The memory controllers 22A–22D coupled to the respective memories 20A–20D include control circuitry for interfacing to the memories 20A–20D. The memory controllers 22A–22D may include request queues (e.g., buffers) for queuing memory access requests. Where multiple processing nodes 16 include caches similar to the cache 38, the memory controllers 22A–22D may be responsible for ensuring that memory accesses to the respective memories 20A–20D occur in a cache-coherent fashion, as will be described in detail below, and thus may order memory access requests by placing the requests in the request queues.

As indicated in FIGS. 1 and 2 and described above, the bi-directional communication links 18 and 26 may include two unidirectional sets of transmission media. In an exemplary embodiment, the communication link 26A in FIG. 2 includes a first set of three unidirectional transmission media directed from the interface 32 to the I/O node 24A, and a second set of three unidirectional transmission media directed from the I/O node 24A to the interface 32. Both the first and second sets include separate transmission media for a clock (CLK) signal, a control (CTL) signal, and a command/address/data (CAD) signal. In one embodiment, the CLK signal serves as a clock signal for the CTL and CAD signals. A separate CLK signal may be provided for each eight-bit byte of the CAD signal. The CAD signal is used to convey control information and data. The CAD signal may be, for example, 8, 16, or 32 bits wide, and thus may include 8, 16, or 32 separate transmission media.

The CTL signal is asserted when the CAD signal conveys a bit time of control information, and is deasserted when the CAD signal conveys a bit time of data. The CTL and CAD signals may transmit different information on the rising and falling edges of the CLK signal. Accordingly, two bit times may be transmitted in each period of the CLK signal. In an exemplary embodiment, the communication link 26A in FIG. 2 and described above is typical of the communication links 18 within the processing subsystem 12 and the communication links 26 within the I/O subsystem 14.

The processing nodes 16A–16D implement a packet-based link for inter-processing node communication. The communication links 18 are used to transmit packets between the processing nodes 16 within the processing subsystem 12, and are operated in a "coherent" fashion such that the processing subsystem 12 preserves the coherency of data stored within the memories 20A–20D and the caches of the processing nodes 16A–16D. The interconnected processing nodes and the interconnecting communication links in the processing subsystem 12 are referred to as a "coherent fabric."

The I/O nodes 24A–24C also implement a packet-based link for inter-I/O node communication. The communication links 26B and 26C are used to transmit packets between the I/O nodes 24 within the I/O subsystem 14, and the communication link 26A is used to transmit packets between the I/O node 24A and the processing node 16C. The communication links 26A–26C are operated in a "non-coherent" fashion since data stored in I/O subsystem 14 is not cached. The interconnected I/O nodes and the interconnecting communication links in the I/O subsystem 14 are referred to as a "non-coherent fabric."

Interface logic used within the computer system 10 (e.g., interface logic 30A–30B and 32) may include buffers for receiving packets from a communication link and for buffering packets to be transmitted upon the communication link. The computer system 10 may employ any suitable flow control mechanism for transmitting packets. For example, interface logic within each node may store a count of the number of each type of buffer within interface logic of a receiving node at the other end of a communication link. A sending node may not transmit a packet unless the receiving node has a free buffer of the correct type for storing the packet. As each buffer is freed within the receiving node (e.g., by forwarding or issuing a stored packet), the receiving node transmits a message to the sending node indicating that the buffer has been freed. Such a mechanism may be referred to as a "coupon-based" system.

A packet transmitted within the computer system 10 may pass through one or more intermediate processing and/or I/O nodes. For example, a packet transmitted by the processing node 16A to the processing node 16C within the processing subsystem 12 may pass through either the processing node 16B or the processing node 16D. (See FIG. 1.) Any suitable packet routing algorithm may be used within the processing subsystem 12.

Within the I/O subsystem 14, packets travel in I/O streams, which are groupings of traffic that can be treated independently by the noncoherent fabric. In an exemplary embodiment, direct peer-to-peer communications do not exist within the noncoherent fabric, and all packets travel either to or from the host bridge 28 in the processing node 16C. Accordingly, packets in the I/O subsystem are either transmitted in a direction toward the host bridge 28 (i.e., "upstream") or in a direction away from the host bridge 28 (i.e., "downstream"), and may pass through one or more intermediate I/O nodes 24. For example, a packet transmitted by the I/O node 24C to the I/O node 24A passes through the I/O node 24B, through the I/O node 24A, to the host bridge 28, and back to the I/O node 24A. Thus, peer-to-peer communication is indirectly supported by having a requester issue a packet to the host bridge 28, and having the host bridge 28 generate a packet back downstream to the target. Other embodiments of computer system 10 may include more or fewer processing nodes 16 and/or I/O nodes 24 than the embodiment of FIG. 1.

The coherent packets used within processing subsystem 12 and the non-coherent packets used in the I/O subsystem 14 may have different formats, and may include different types of information. In general, as will be described in more detail below, the host bridge 28 translates packets moving from one subsystem to the other. For example, a non-coherent packet transmitted by an I/O node in the I/O subsystem 14 and having a target within the processing subsystem 12 passes through the host bridge 28, which translates the non-coherent packet to a corresponding coherent packet and issues the coherent packet onto the coherent fabric.

Coherent Packets Within Processing Subsystem 12

FIGS. 3–6 illustrate exemplary coherent packet formats which may be employed within the processing subsystem 12. FIGS. 3–5 illustrate exemplary coherent information, request, and response packets, respectively, and FIG. 6 illustrates an exemplary coherent data packet. Information (info) packets carry information related to the general operation of the communication link, such as flow control information, error status, etc. Request and response packets carry control information regarding a transaction. Certain request and response packets may specify that a data packet follows. The data packet carries data associated with the transaction and the corresponding request or response packet. Other embodiments may employ different packet formats.

The exemplary packet formats of FIGS. 3–6 show the contents of eight-bit bytes transmitted in parallel during consecutive "bit times". The amount of time used to transmit each data unit of a packet (e.g., byte) is referred to herein as a "bit time". Each bit time is a portion of a period of the CLK signal. For example, within a single period of the CLK signal, a first byte may be transmitted on a rising edge of the CLK signal, and a different byte may be transmitted on the falling edge of the CLK signal. In this case, the bit time is half the period of the CLK signal. Bit times for which no value is provided in the figures may either be reserved for a given packet, or may be used to transmit command-specific information.

FIG. 3 is a diagram of an exemplary coherent information (info) packet 40 which may be employed within processing subsystem 12. The info packet 40 includes four bit times on an eight-bit coherent communication link. A six-bit command field Cmd[5:0] is transmitted during the first bit time (i.e., bit time 0). The request and response packets of FIGS. 4 and 5 include a similar command encoding in the same bit positions during bit time 0. Info packet 40 may be used to transmit messages between nearest neighbor nodes. Additionally, info packets may be used to transmit messages indicating the freeing of buffers in the coupon-based flow control scheme described above. Other types of info packets include a system synchronization (Sync) packet and a nooperation (NOP) packet. In one embodiment, the messaging protocol may require that info packets are not flow controlled and should always be accepted at their destination node.

FIG. 4 is a diagram of an exemplary coherent request packet 42, which may be employed within the processing subsystem 12. The request packet 42 comprises eight bit times on an eight-bit coherent communication link. The request packet 42 may be used to initiate a transaction (e.g. a read or write transaction). Generally, a request packet indicates an operation to be performed by the destination node, which is referred to as the target of the request.

The bits of a command field Cmd[5:0] identifying the type of request are transmitted during bit time 0. Bits of a source unit field SrcUnit[1:0] containing a value identifying a source unit within the source node are also transmitted during bit time 0. Types of units within the computer system 10 may include memory controllers, caches, processors, etc. Bits of a source node field SrcNode[2:0] containing a value uniquely identifying the source node are transmitted during bit time 1. Bits of a destination node field DestNode[2:0] containing a value which uniquely identifies the destination node may also be transmitted during bit time 1, and may be used to route the packet to the destination node. Bits of a destination unit field DestUnit[1:0] containing a value identifying the destination unit within the destination node which is to receive the packet may also be transmitted during bit time 1.

Request packets may also include bits of a source tag field SrcTag[4:0] in bit time 2 which, together with the source node field SrcNode[2:0] and the source unit field SrcUnit[1:0], may link the packet to a particular transaction of which it is a part. Bit time 3 may be used in some requests to transmit the least significant bits of the address affected by the transaction. Bit times 4–7 are used to transmit the bits of an address field Addr[39:8] containing the most significant bits of the address affected by the transaction. Some of the undefined fields in the packet 42 may be used in various request packets to carry command-specific information.

FIG. 5 is a diagram of an exemplary coherent response packet 44 which may be employed within processing subsystem 12. The response packet 44 includes the command field Cmd[5:0], the destination node field DestNode[2:0], and the destination unit field DestUnit[1:0]. The destination node field DestNode[2:0] identifies the destination node for the response packet. The destination unit field DestUnit[1:0] identifies the destination unit within the destination node. Various types of response packets may include additional information.

Generally, the response packet 44 is used for responses during the carrying out of a transaction which do not require transmission of the address affected by the transaction. Furthermore, the response packet 44 may be used to transmit positive acknowledgement packets to terminate a transaction. Similar to the request packet 42, the response packet 44 may include the source node field SrcNode[2:0], the source unit field SrcUnit[1:0], and the source tag field SrcTag[4:0] for many types of responses (illustrated as optional fields in FIG. 5).

FIG. 6 is a diagram of an exemplary coherent data packet 46 which may be employed within the processing subsystem 12. The data packet 46 of FIG. 6 includes eight bit times on an eight-bit coherent communication link. The data packet 46 may comprise different numbers of bit times based on the amount of data being transferred. For example, in one embodiment, a cache block comprises 64 bytes and, hence, 64 bit times on an eight-bit link. Data packets for transmitting data less than cache block size may employ fewer bit times. In one embodiment, non-cache block sized data packets may transmit several bit times of mask bits prior to transmitting the data to indicate which data bytes are valid within the data packet. Furthermore, cache block data may be returned as an eight-byte quadword addressed by the least significant bits of the request address first, followed by interleaved return of the remaining quadwords.

FIG. 7 is a table 48 listing different types of coherent packets which may be employed within the processing subsystem 12. Other embodiments of the processing subsystem 12 are possible and contemplated, and may include other suitable sets of packet types and command field encodings. The table 48 includes a command code column including the contents of command field Cmd[5:0] for each coherent command, a command column including a mnemonic representing the command, and a packet type column indicating which of the coherent packets 40, 42, and 44 (and the data packet 46, where specified) is employed for that command. A brief functional description of some of the commands in table 48 is provided below.

A read transaction may be initiated using a sized read (Read(Sized)) request, a read block (RdBlk) request, a read block shared (RdBlkS) request, or a read block with intent to modify (RdBlkMod) request. The Read(Sized) request is used for non-cached reads, which may be other than a cache block in size. The amount of data to be read is encoded into the Read(Sized) request packet. The RdBlk request is used to acquire a copy of an addressed cache block. Thus, for reads of a cache block, the RdBlk request may be used unless: (i) a writeable copy of the cache block is desired, in which case the RdBlkMod request may be used; or (ii) a copy of the cache block is desired but no intention to modify the block is known, in which case the RdBlkS request may be used. The RdBlkS request may be used to make certain types of coherency schemes (e.g. directory-based coherency schemes) more efficient.

A write transaction may be initiated using a sized write (Wr(Sized)) request or a victim block (VicBlk) request followed by a corresponding data packet. The Wr(Sized) request is used for non-cached writes, which may be other than a cache block in size. A victim cache block which has been modified by a node and is being replaced in a cache within the node is transmitted back to memory using the VicBlk request. A change to dirty (ChangetoDirty) request packet may be issued by a source node to obtain write permission for a cache block stored by the source node in a non-writeable state. A validate block (ValidateBlk) request may be used to obtain write permission to a cache block not stored by a source node if the source node intends to update the entire cache block.

To maintain coherency for certain write and read requests, the memory controller in the target node may broadcast Probes to each of the other nodes in the system to determine or change the state of the caches in those nodes, as will be described in further detail below. A Broadcast request packet may be used to broadcast messages between nodes (e.g., to distribute interrupts).

Different types of response packets may be issued during a particular transaction, for example, to acknowledge receipt of a request packet, completion of an operation, provide requested data, etc. Thus, responses may be used to contribute to the maintenance of coherency in the processing subsystem 12. Types of response packets listed in table 48 of FIG. 7 include a Probe response (ProbeResp) packet, a Read response (RdResponse) packet, a Memory Cancel (Mem- Cancel) packet, a Target Start (TgtStart) packet, a Target Done (TgtDone) packet, and a Source Done (SrcDone) packet.

Probe response packets may be transmitted by probed caches in the processing nodes in response to a Probe packet that is part of a write or read transaction. The Probe response packet may be used to transmit information relative to the state of the probed node's cache. Alternatively, if the probed node is storing dirty data in its cache, then a Read response packet may be returned along with the dirty data. A Read response packet and data packet also are used to transmit requested read data from a target node to a requester.

During a read transaction, if a probed node is storing dirty data, the probed node may transmit (in addition to the Read Response packet to the requester) a Memory Cancel response packet to the target node in an attempt to cancel transmission by the target node of the requested read data. A Target Start response may be used by a target to indicate that a transaction has been started, thus facilitating ordering of subsequent transactions. A Target Done response packet may be transmitted to a requester to provide positive acknowledge of the termination of a transaction. Similarly, the requester may issue a Source Done response packet back to a target to indicate completion of a transaction and, thus, to facilitate ordering and expedited performance of subsequent transactions. The role that each of these types of responses play in maintaining coherency will be discussed in further detail below.

Table 48 of FIG. 7 also includes a virtual channel (Vchan) column. The Vchan column indicates the virtual channel in which each packet travels (i.e., to which each packet belongs). In the present embodiment, four virtual channels are defined: a non-posted request (NPR) virtual channel, a posted request (PR) virtual channel, a response (R) virtual channel, and a probe (P) virtual channel.

Generally speaking, a "virtual channel" is a communication path for carrying packets between various processing nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (e.g., by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links (e.g. lines 18 in FIG. 1). However, since a receiving buffer is available prior to transmission, the virtual channels do not block each other even while using this shared resource.

Each different packet type (e.g. each different command field Cmd[5:0]) could be assigned to its own virtual channel. However, the hardware to ensure that virtual channels are physically conflict-free may increase with the number of virtual channels. For example, in one embodiment, separate buffers are allocated to each virtual channel. Since separate buffers are used for each virtual channel, packets from one virtual channel do not physically conflict with packets from another virtual channel (since such packets would be placed in the other buffers). It is noted, however, that the number of required buffers increases with the number of virtual channels. Accordingly, it is desirable to reduce the number of virtual channels by combining various packet types which do not conflict in a logical/protocol fashion. While such packets may physically conflict with each other when travelling in the same virtual channel, their lack of logical conflict allows for the resource conflict to be resolved without deadlock. Similarly, assigning packets which may logically conflict with each other to separate virtual channels provides for no resource conflict between the packets. Accordingly, the logical conflict may be resolved through the lack of resource conflict between the packets by allowing the packet which is to be completed first to make progress.

In one embodiment, packets travelling within a particular virtual channel on the coherent link from a particular source node to a particular destination node remain in order. However, packets from the particular source node to the particular destination node which travel in different virtual channels are not ordered. Similarly, packets from the particular source node to different destination nodes, or from different source nodes to the same destination node, are not ordered (even if travelling in the same virtual channel).

Packets travelling in different virtual channels may be routed through the computer system 10 differently. For example, packets travelling in a first virtual channel from the processing node 16A to the processing node 16C may pass through the processing node 16B, while packets travelling in a second virtual channel from the processing node 16A to the processing node 16C may pass through the processing node 16D. Each node may include circuitry to ensure that packets in different virtual channels do not physically conflict with each other.

As discussed above, the virtual channels may include a posted request virtual channel, which is reserved for "posted" transactions, and a non-posted request virtual channel, which is reserved for "non-posted" transaction. A given transaction may be a "posted" transaction or a "non-posted" transaction. Generally speaking, a posted transaction is considered complete by the requester (e.g., a unit within a node) when the request and corresponding data are transmitted by the requester onto the communication fabric (e.g., which may include the packet processing logic on the node). As a result, a response is not needed to indicate completion of the transaction to the requester, and the posted transaction is thus effectively completed at the requester. Because the requester need not wait for a response acknowledging completion, the requester may continue with other transactions while the packet or packets of the posted transaction travel to the target and the target completes the posted transaction.

In contrast, a non-posted transaction is not considered complete by the requester until the target has completed the non-posted transaction. The target generally transmits an acknowledgement (e.g., a Target Done response) to the requester when the non-posted transaction is completed. Such acknowledgements, however, consume interconnect bandwidth and must be received and accounted for by the requester. Non-posted transactions may be used when the requester needs notification of when the request has actually reached its destination before the requester can issue subsequent transactions.

In an exemplary embodiment, non-posted Wr(Sized) requests are assigned to the NPR virtual channel, and posted Wr(Sized) requests are assigned to the PR virtual channel. A bit in the command field Cmd[5:0] may be used to distinguish posted writes and non-posted writes.

Non-Coherent Packets For I/O Subsystem 14

FIGS. 8 and 9 illustrate exemplary non-coherent request and response packet formats which may be employed in the I/O subsystem 14. In addition to the request and response packets, data packets and info packets also may be used. The data and info packets in the non-coherent fabric may have the same format as the data and info packets illustrated in FIGS. 3 and 6, respectively. The packet formats shown in FIGS. 8 and 9 include the contents of eight-bit bytes transmitted in parallel during consecutive bit times. Bit times for which no value is provided may be either reserved for a particular packet or used to convey packet-specific information. Fields indicated by dashed lines are optional fields in some packet types.

It should be understood that many different types of communication protocols and corresponding packet formats may be implemented depending on the arrangement and requirements of the particular I/O subsystem 14. The I/O protocol and packet formats described herein are provided merely as one example to facilitate the discussion of ordering requirements imposed by the non-coherent fabric which must be carried through to the coherent fabric, as will become evident from the description set forth below.

FIG. 8 is a diagram of an exemplary non-coherent request packet 50 which may be employed in the I/O subsystem 14. The request packet 50 includes command field Cmd[5:0] which identifies the type of request similar to the command field Cmd[5:0] of the coherent request packet. Additionally, an optional source tag field SrcTag[4:0], similar to the source tag field SrcTag[4:0] of the coherent request packet, may be transmitted in bit time 2. The address affected by the transaction may be transmitted in bit times 4–7 and, optionally, in bit time 3 for the least significant address bits. If a particular request does not require an address, then Addr [39:8] in bit times 4–7 is not transmitted, and, thus also may be optional.

A unit ID field UnitID[4:0] is included in bit time 1 and may be used to identify the logical source of the request packet. The unit ID is a unique identifier assigned to an I/O node, and an I/O node may have multiple unit IDs if, for example, the node includes multiple devices or functions which are logically separate. Accordingly, an I/O node may generate request packets having different unit IDs. In an exemplary embodiment, the unit ID of "0" is reserved for the host bridge and thus may be used to distinguish between requests traveling toward the host bridge and requests traveling away from the host bridge.

Additionally, the request packet 50 includes a sequence ID field SeqID[3:0] transmitted in bit times 0 and 1. The sequence ID field SeqID[3:0] may be used to group a set of two or more request packets that are travelling in the same virtual channel and have the same unit ID. For example, if the SeqID field is zero, a packet is unordered with respect to other packets. If, however, the SeqID field has a non-zero value, the packet is ordered with respect to other packets in the same virtual channel having a matching value in the SeqID field and the same UnitID.

The request packet 50 also includes a pass posted write (PassPW) bit transmitted in bit time 1. The PassPW bit indicates whether the request packet 50 is allowed to pass posted write requests issued from the same unit ID. In an exemplary embodiment, if the PassPW bit is clear, the packet is not allowed to pass a previously transmitted posted write request packet. If the PassPW bit is set, the packet is allowed to pass prior posted writes. For read request packets, the command field Cmd[5:0] may include a bit having a state which indicates whether read responses may pass posted write requests. The state of that bit determines the state of the PassPW bit in the response packet corresponding to the read request packet.

FIG. 9 is a diagram of an exemplary non-coherent response packet 52 which may be employed within the I/O subsystem 14. The response packet 52 includes the command field Cmd[5:0], the unit ID field UnitID[4:0], the source tag field SrcTag[4:0], and the PassPW bit similar to request packet 50 described above. In addition, the response packet 52 includes a Bridge bit, an Error bit, and an NXA (non-existent address) bit. Other bits may be included in the response packet 52 as needed.

The Bridge bit indicates whether the packet was issued by the host bridge and, thus, may be used to distinguish response packets that are traveling upstream (i.e., the Bridge bit is clear) from response packets that are traveling downstream (i.e., the Bridge bit is set). The Error bit in the response packet indicates whether an error occurred during the read request and, thus, whether the return data may be used. The NXA bit indicates whether an error occurred because the corresponding request packet had been directed to a non-existent address.

FIG. 10 is a table 54 listing different types of non-coherent request packets which may be employed within the I/O subsystem 14. Other embodiments of the I/O subsystem 14 are possible and contemplated, and may include other suitable sets of packets and command field encodings. The table 54 includes a command (CMD) code column listing the command encodings assigned to each non-coherent command, a virtual channel (Vchan) column defining the virtual channel to which the non-coherent packets belong, a command (Command) column including a mnemonic representing the command, and a packet type (Packet Type) column indicating which of the packets 40, 50, and 52 (and the data packet 46 where specified) is employed for that command.

The NOP, Wr(Sized), Read(Sized), RdResponse, TgtDone, and Broadcast packets may be similar to the corresponding coherent packets described with respect to FIG. 7. However, within the I/O subsystem 14, neither Probe nor probe response packets are issued as data is not cached within the I/O subsystem 14. Posted/non-posted write transactions may again be identified by the value of a bit in the command field of the Wr(Sized) request, as described above.

Memory Ordering in the Processing Subsystem 12

Ordering of transactions directed to memory in a distributed communication system, such as computing system 10, can be more complex than in a having a shared bus connecting all resources. In such shared bus systems, because all transactions directed to memory are routed via a common path (i.e., the shared bus), ordering of memory transactions may be managed by observing and controlling the flow of traffic on the common path. As a result, the shared bus is the memory ordering point.

Transactions directed to memory in a distributed communication system, on the other hand, may be directed to several different memory controllers and take several different routes to reach any particular memory controller. Thus, no single common point is present which lends itself toward providing a memory ordering point, and transactions may reach a particular target in any order, creating the potential for loss of data, retrieval of stale data, etc. Indeed, in the exemplary embodiment, the only ordering ensured by the fabric itself is that packets traveling in the same virtual channel, from the same source to the same destination, will remain in order.

To address these potential ambiguities, memory ordering in an exemplary embodiment is managed by the memory controllers and is based on the order of receipt of the request. That is, the memory controllers process requests to a given address in the order in which the requests were received. Further, each request in the ordered sequence must be terminated by the requester (e.g., by transmitting an acknowledgement to the memory controller) before the next request to the same address may be processed. Thus, the target memory controller of a request is defined as the memory ordering (or coherence) point for that request, and the memory controller ensures that requests to the same address (i.e., cache line) will appear (to other observers in the system) to complete in the same order in which the requests reached their coherence point.

In a distributed communication system, the fact that a request has reached its target memory controller (i.e., the coherence point) does not ensure that the other processing nodes in the processing subsystem 12 are aware of the request. This lack of awareness may be problematic, because each of the other processing nodes may include a cache and, thus, may be storing data affected by the request. Accordingly, upon receipt of a memory request, the target memory controller issues Probes to the caches in all other processing nodes in the processing subsystem 12. Once the probes have been received and processed, and appropriate cache state transitions have been completed, the memory transaction has progressed to the point at which all other processing nodes have observed it (i.e., the transaction has been globally observed). Thus, in the exemplary embodiment, the issuance of probes contributes to maintaining the ordering of transactions.

In addition to managing and ordering requests to memory, the ordering scheme for the distributed communication system 10 also includes management and ordering of requests directed to the I/O subsystem 14. Ordering of requests to the I/O subsystem may be implemented in a manner similar to memory ordering. For example, in one embodiment, the I/O ordering point is the host bridge (HB) connected to the chain having the targeted I/O node, and I/O ordering is defined based on receipt of a request at the I/O ordering point. Reaching the I/O ordering point does not imply that the request has reached its destination, however, but only that the request will reach its destination before any other request to the same destination that subsequently reaches the I/O ordering point.

The ordering scheme implemented in the exemplary embodiment of the distributed communication system 10 also establishes memory commit points for various types of transactions. The memory commit point is the point in a write transaction at which data may be written to memory (e.g., DRAM), which is the point at which all information has been received that is needed to determine that the final write data is present. For example, in one embodiment, although the transaction may have been globally observed upon receipt and processing of the cache probes (including changing the state of the cache line as appropriate), the transaction may not yet have reached a point at which the write data may be written to memory (i.e., the memory commit point) by the target memory controller. However, the ordering protocol ensures that once the memory commit point is reached, and regardless of whether the data actually is immediately written to target memory, all subsequent read requests to the address affected by the transaction will return the write data. Descriptions of memory commit points for various types of write transactions will be provided below.

Processor commit points also are established as part of the ordering scheme. The processor commit point is the point at which a processor-issued transaction has progressed far enough such that any subsequent requests from that processor will be globally observed (i.e., observed by all requesters within the coherent fabric) to complete after it. Thus, if ordered completion of transactions is desired in a particular implementation of the computing system 10, a processing node in the processing subsystem 12 waits until a particular request has reached the processor commit point before that processing node issues a new request. If ordered completion of transactions is not desired, the processing device may issue subsequent requests without waiting for previous requests to reach the processor commit point. Various examples of processor commit points for different types of transactions will be provided below.

Ordering of I/O Transactions in the Processing Subsystem 12

Many types of I/O subsystems (e.g., PCI) may require that certain ordering protocols be followed with respect to I/O transactions directed to coherent memory. Such I/O subsystems implement an ordering protocol that assures that communications traveling within the I/O subsystem to the host bridge will remain in the order dictated by that particular type of I/O subsystem. For example, PCI systems require that a write request must push any prior write requests and read requests ahead of it in the I/O stream.

The ordering requirements imposed by the I/O subsystem also must be maintained after the host bridge issues the transaction onto the coherent fabric. However, due to the distributed nature of the coherent fabric, a prior transaction cannot be guaranteed to reach its target and complete before a subsequent transaction reaches its target and completes. Accordingly, wait restrictions may be imposed on the host bridge to ensure that a new transaction is not issued until a previously issued transaction has progressed far enough within the coherent fabric that ordering of the transactions can be maintained. Alternatively, the ordering protocol may dictate that a transaction may progress, but completion of that transaction be delayed until a previously issued transaction has completed.

As described above, the host bridge 28 translates packets between the processing subsystem 12 and the I/O subsystem 14. Turning now to FIG. 11, a table 56 is shown illustrating operation of one embodiment of the host bridge 28 in response to a pair of ordered requests received from a particular unit within the non-coherent fabric. To guarantee ordering from the point of view of all observers, the host bridge waits for responses to prior packets before issuing new packets into the coherent fabric. In this manner, the host bridge may determine that the prior packets have progressed far enough into the coherent fabric for subsequent actions to be taken without disturbing ordering.

The host bridge 28 may determine which of the packets coming from the non-coherent fabric have ordering requirements. Such a determination may be accomplished by examining the command encoding, UnitID, SeqID, PassPW fields in each of the packets, and applying the rules from table 56. For example, ordering requirements may exist if the two request packets have matching non-zero sequence IDs, or if the first request packet is a posted write and the second request has the PassPW bit clear. Unordered packets require no special action by the host bridge; they may be issued to the coherent fabric in any order as quickly as the host bridge can send them out. Ordered packets, on the other hand, have the wait requirements which are listed in table 56.

Table 56 includes a Request₁ column listing the first request of the ordered pair, a Request₂ column listing the second request of the ordered pair, and a wait requirements column listing responses that must be received before the host bridge 28 may allow the second request to proceed.

Unless otherwise indicated in table 56, the referenced packets are on the coherent fabric. Also, in an exemplary embodiment, combinations of requests which are not listed in table 58 do not have wait requirements. Still further, table 58 applies only if the host bridge 28 first determines that ordering requirements exist between two request packets.

In the first entry of table 56, a pair of ordered memory write requests are completed by the host bridge 28 by delaying transmission of the second memory write request until a Target Start response corresponding to the first memory write request is received by the host bridge 28. Additionally, the host bridge 28 withholds a Source Done response corresponding to the second memory write request until a Target Done response corresponding to the first memory write request has been received. Finally, the Target Done response corresponding to the second memory write request on the non-coherent link (if the memory write is a non-posted request) is delayed until the Target Done response corresponding to the first memory write request has been received from the coherent fabric. The other entries in the table of FIG. 11 may be interpreted in a manner similar to the description given above for the first entry.

Thus, in general, the I/O subsystem 14 provides a first transaction Request₁ and a second transaction Request₂ to the host bridge 28, wherein the Request₂ follows Request₁. The host bridge 28 dispatches Request₁ within the processing subsystem 12. In accordance with the ordering protocol, the host bridge 28 may dispatch Request₂ within the processing subsystem 12 dependent upon the progress of Request₁ within the processing subsystem 12 as indicated by the various types of responses which are issued. Alternately, the host bridge 28 may delay completion of Request₂ with respect to Request₁. Examples of ordered transactions will be provided below.

The Ordering Scheme

Thus, in the exemplary embodiment, the ordering scheme results in wait requirements that are imposed on the various devices to assure that certain types of ordered behavior will occur. In the exemplary embodiment, ordered behavior with respect to write ordering, read ordering, and write serialization results from the ordering scheme and may be expressed by the following rules:

1. Write Ordering: If a write to address B is issued after a write to address A, then if a read to address B returns new data, a read to address A also must return new data.
2. Read Ordering: If a read to address A returns new data, then a subsequent read to address A also must return new data.
3. Write Serialization: Processor 1 issues a write to address A, followed by a read to address B. Processor 2 issues a write to address B, followed by a read to address A. The write to address A and the write to address B may occur in any order, including simultaneously. If the read to address B returns old data, then the read to address A must return new data. Similarly, if the read to address A returns old data, then the read to address B must return new data.

The behavioral rules set forth above may be enforced simply by imposing a wait requirement on the devices (e.g., a host bridge) that causes transactions to be stalled until the device receives confirmation that a previously issued transaction has completed. For example, a write transaction is considered complete when all cached copies of data for the addressed location have been invalidated and the target of the write transaction has the only valid copy. However, stalling transactions until previous transactions reach a point of completion may create potentially lengthy delays. The exemplary embodiment reduces these delays by implementing a communication scheme in which transactions include different types of dependent communications, and devices must wait until a particular type of communication is received before issuing a new transaction. Thus, in accordance with the scheme, communications interact in a manner that expedites the issuance and completion of the transactions, while assuring that ordering (and coherency) is maintained.

As will be illustrated in the packet-based transaction examples described below, the dependent communications include Probes, Probe responses, Read responses, a Target Start response, a Target Done response, a Source Done response, and a Memory Cancel response. Exemplary packet formats for these communications are illustrated in FIGS. 12 and 15–17.

Turning first to FIG. 12, an exemplary format of a Probe packet 58 is illustrated. The Probe packet includes a Cmd [5:0] field, which includes the command encoding identifying the request as a probe; SrcUnit [1:0] and SrcNode [2:0] fields which identify the source node and source unit which initiated the original request; a SrcTag [4:0] field containing the source tag assigned to the transaction; and Addr [39:3] fields providing the address affected by the transaction. Because Probes are broadcast to all processor nodes in the processing subsystem 12, including both the source node and the node issuing the probe, no destination information is included in the Probe packet. Rather, the Probe packet includes TgtNode [2:0] and TgtUnit [1:0] fields which contain the node ID and unit ID, respectively, of the target of the original request (e.g., a memory controller, the source of the Probes). In one embodiment, this information is used to route the Probe on the coherent fabric. For example, each processor node may include a broadcast routing table indexed by target node and target unit, which provides information regarding the appropriate communication link on which to route a Probe packet based on the target of the original request. This information also may be used to determine the appropriate destination for response packets issued in response to the Probe, as will be described in further detail below.

The Probe packet also includes a NextState [1:0] field, Return Data (RD) bit, and a Memory Data (MD) bit. The encoding in the NextState field indicates the state transition that should occur if the probe hits in a cache. For example, with reference to the table 60 in FIG. 13, an encoding of "0" in the NextState field indicates that the state of a hit cache line should not be changed. Similarly, an encoding of "1" in the NextState field indicates that the state of a hit cache line should be changed to "Shared." Finally, an encoding of "2" in the NextState field indicates that the cache line should be invalidated if a probe hit occurs.

The Return Data bit indicates whether the data in the cache line should be moved as a result of a cache hit. In one embodiment, if the Return Data bit is set, data is returned if the Probe hits dirty or shared/dirty data.

The Memory Data bit indicates whether the node/unit which issued the Probe (e.g., the memory controller) intends to return read data to the source of the read request. Thus, for example, if the Memory Data bit and the Return Data bit both are set, and the Probe hits dirty data in a cache, then the processor node owning the cache may send a Memory Cancel request to the memory controller, indicating that the memory controller need not return the data to the source node since the probed node will be returning the most recent data (i.e., the dirty data).

In addition to the Return Data and Memory Data bits, the Probe packet also may include a response bit which indicates whether the response to the Probe should be sent to the source node/source unit or to the target node/target unit. In the exemplary embodiment, the destination for the response is based on the type of transaction initiated by the original source, as will be shown below.

FIG. 14 provides a table 62 which lists the various types of Probes that may be generated by a target (e.g., a memory controller) of a particular type of request. The table 62 includes a Transaction Class column which lists the type of request issued by the source node which initiated the transaction. The table 62 also includes a Next State column indicating the information that should be placed in the Next State field of the Probe packet for a particular type of request. Similarly, the table 62 includes a Memory Data column and a Return Data column listing the state of the Memory Data and Return Data bits, respectively, for each particular type of request. Finally, the table 62 includes a Response Tgt column which identifies the appropriate destination (i.e., either source node/source unit or target node/target unit) to which the response packet should be returned for each particular type of request.

In the exemplary embodiment, probed nodes generate either a Probe response or a Read response packet in response to a Probe, based on whether data will be moved (i.e., based on the state of the Return Data bit and the state of the line in the probed cache). For example, if a Probe hits dirty data in a cache and the Return Data bit is set, the probed cache will return a Read response packet followed by a data packet containing the dirty data. On the other hand, if data will not be returned (i.e., the probe does not hit dirty, or the Return Data bit is clear), the probed cache will return a Probe response packet instead. The Probe response or Read response is returned to either the source node/source unit or the target node/target unit as indicated by the encoding (i.e., the Response bit) in the Probe packet. For example, with reference to table 62, a memory controller that is the target of a Read request broadcasts a Probe to all processor nodes in the processing subsystem 12. The processor nodes respond to the Probe by directing either a Probe response or a Read response to the source node/source unit. A memory controller, which is the target of a Sized Write request, also broadcasts Probes to all processor nodes in the processing subsystem 12. However, the processor nodes respond to the Probe by directing either a Probe response or a Read response back to the target node/target unit (e.g., the memory controller) rather than the source node/source unit.

Exemplary formats for a Probe response packet 64 and a Read response packet 66 are illustrated in FIGS. 15 and 16, respectively. Both packets 64 and 66 include a Cmd[5:0] field, which includes the appropriate command encoding; SrcUnit[1:0] and SrcNode[2:0] fields, which identify the unit and node which initiated the transaction; and a SrcTag[4:0] field containing the source tag assigned to the transaction. Both packets also include a DestNode[2:0] field and a DestUnit[1:0] field which identify the node and unit to which the Probe response or Read response should be routed. This information may be determined by examining the response bit in the Probe packet, as discussed above.

Both the Probe response and Read response packets also include a Shared bit and an Error bit. In the exemplary embodiment, the Shared bit is set to indicate that the responding node is retaining a copy of the addressed data. The Error bit indicates that the Probe resulted in an error.

The Read response packet 66 also includes a Probe bit, a Cancel bit, and a Count[3:0] field. In the exemplary embodiment, a set Probe bit indicates that the Read response was generated as a result of a Probe requiring data movement. A clear Probe bit indicates that the response is from the memory controller at the target node of the transaction. The Cancel bit is valid only when the Probe bit is set. The Cancel bit indicates that the probed cache has issued a Memory Cancel response to the target memory controller in an attempt to prevent the memory controller from returning a Read response and data. The effect of the Memory Cancel response will be discussed in further detail below in the discussion of the various transaction examples. The Count field indicates the amount of data that will be returned with the Read response.

An exemplary packet format 68 for a Source Done response, a Target Start response, a Target Done response, and a Memory Cancel response is illustrated in FIG. 17. The packet format for these responses includes the Cmd[5:0] field which is encoded to identify the type of response, the SrcUnit[1:0] and SrcNode[2:0] fields which identify the source of the transaction, the SrcTag[4:0] field having the source tag assigned to the transaction, and the DestNode[2:0] and DestUnit[1:0] fields which identify the destination node and unit for the response packet The response packet also includes an Error bit, which may be used to indicate that an error occurred and was recognized at the target before the response packet was issued.

In general, the Source Done response indicates that a transaction has completed at its source. As soon as the source issues a Source Done response, the source may retire the transaction by releasing any buffers reserved for the transaction and may re-use the source tag assigned to the transaction. Note that the requester may issue another request to the same target using the same SrcTag while the SrcDone response is in flight. Because requests and responses travel in different virtual channels, the request may pass the SrcDone response and arrive at the target first. The target should be configured to recognize the new request as belonging to a different transaction despite the matching SrcNode/SrcUnit/SrcTag, and keep the state to the two transactions separate. In one embodiment, the requester may be configured to stall the new request until the SrcDone response for the previous transaction has been received, thus avoiding the potential ambiguity. The Cancel bit in the response packet is valid only for Source Done responses, and is used in a read transaction to indicate to the target memory controller that a probed node has issued a Memory Cancel response due to a probe hit in the probed node's cache. If the Cancel bit is valid, then the memory controller may not retire the transaction (e.g., release transaction buffers) until it has received the Memory Cancel response.

The Target Start response may be used to expedite processing of sized requests, as will be discussed in further detail below. The target of a Sized Read or Write request may issue a Target Start response as soon as the target has received and ordered the request in its buffers.

The Target Done response may be used to signal that a transaction has completed at its target. In some cases, a Target Done response may be implied by a Read response that is received from the target.

As discussed above, the Memory Cancel response may be used to attempt to prevent the memory controller from accessing memory to service either a Read or Write request. The Memory Cancel response may be issued by a probed node which has a valid copy of the addressed data in its cache.

Transaction Examples

Figure 30:
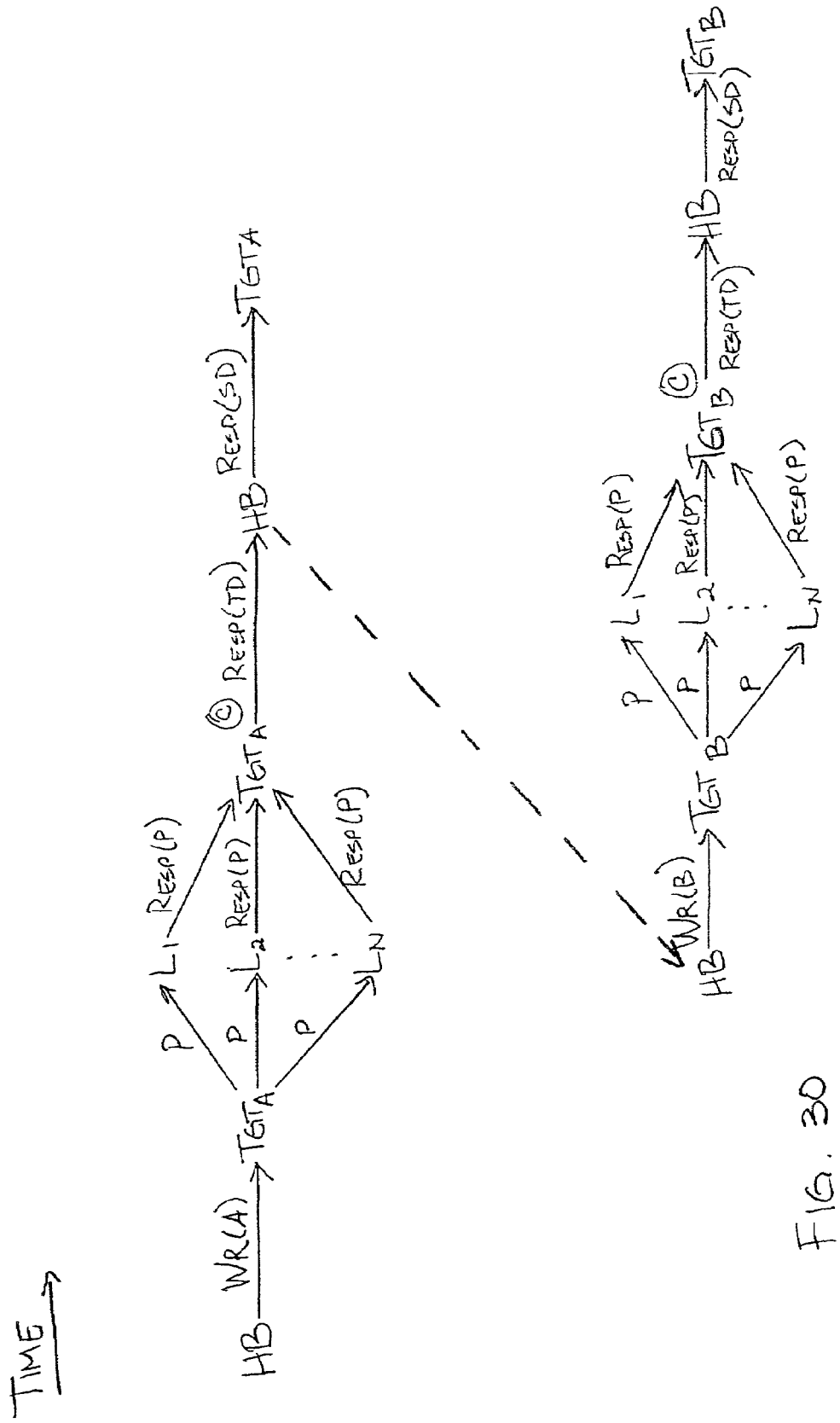
FIG. 30 illustrates an exemplary ordered pair of write transactions as a function of time.
Figure 31:
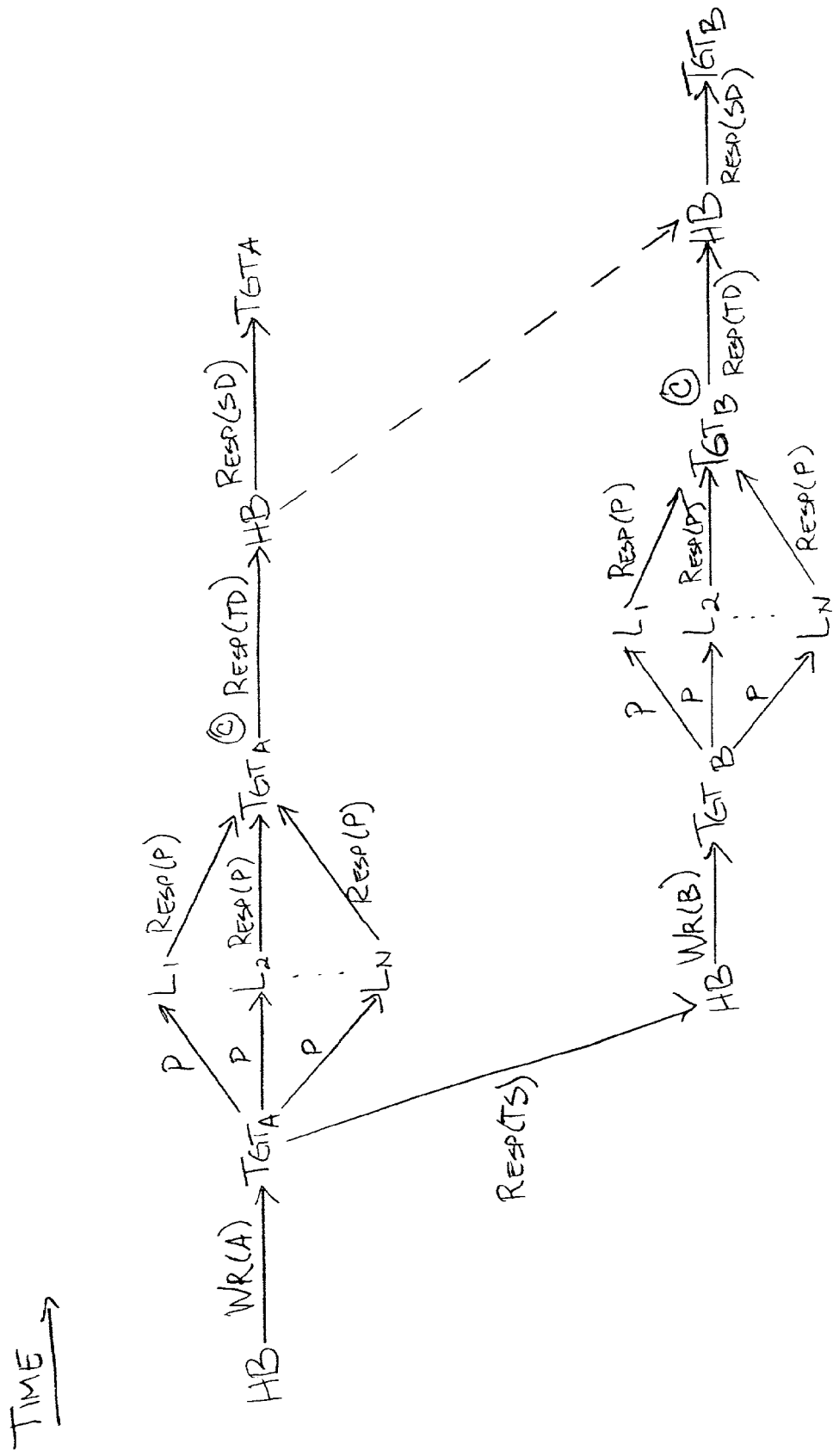
FIG. 31 illustrates the bandwidth improvement attainable for the ordered pair of write transactions of FIG. 30 via the use of the Target Start response.
Figure 32:
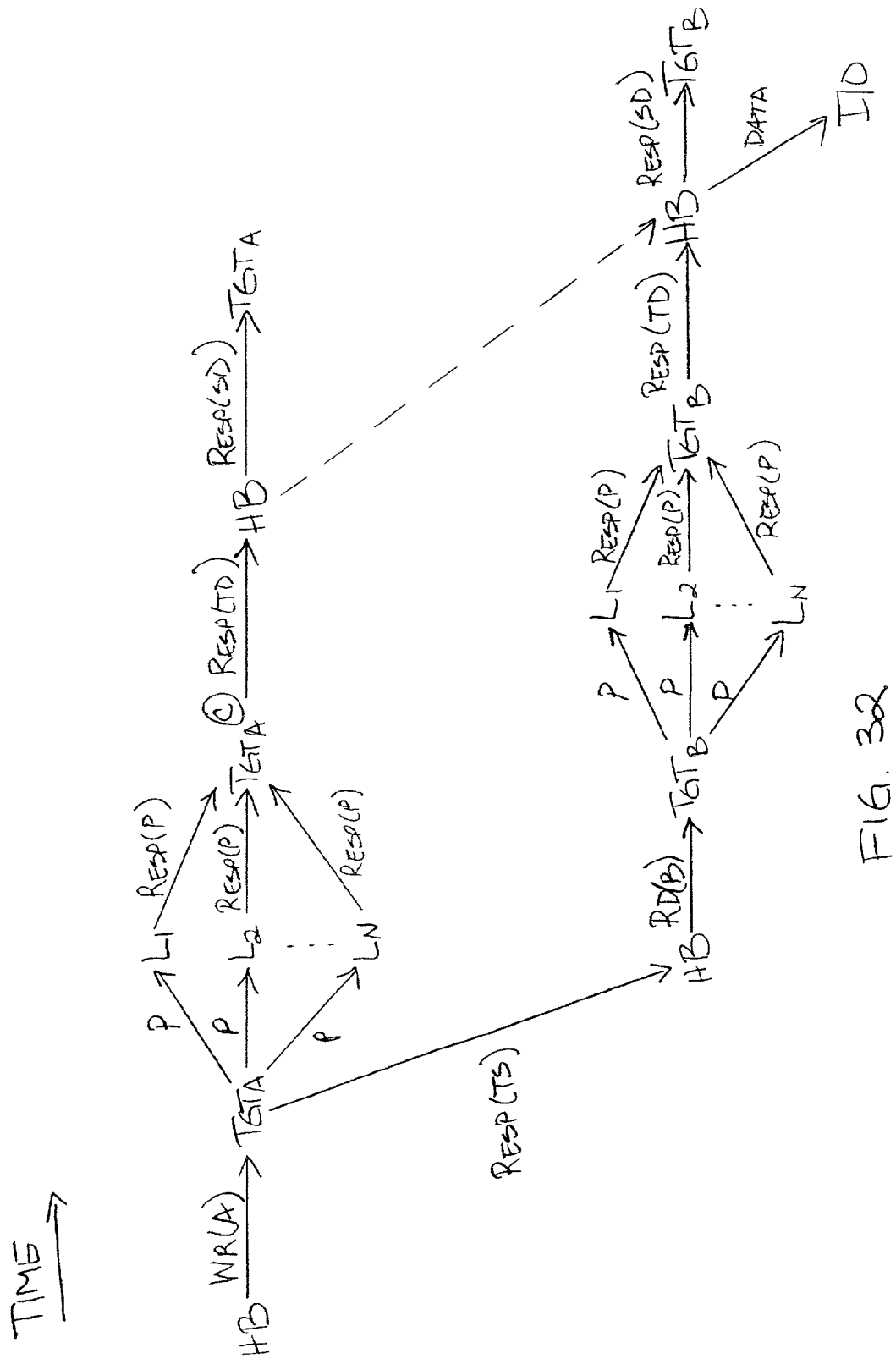
FIG. 32 illustrates an exemplary order write and read transactions as a function of time and the bandwidth improvement attainable via the use of the Target Start response.

Examples of complete transactions are illustrated in FIGS. 18–32, which show the flow of and dependency between various types of requests and responses that participate in a transaction to ensure that ordering constraints are satisfied. The arrows represent dependencies, and outgoing arrows from a node cannot be taken until all incoming arrows (i.e., dependencies) have been satisfied. Dashed arrows represent dependencies that are internal to a node, while most solid arrows represent dependencies that are sent between nodes. In some cases, solid arrows may be sent between different functional units within a single node. In such cases, however, the solid arrows do not result in the transmission of packets from the node, but nonetheless represent packets that are handled internally as if they had been transmitted and received from an external node. Further, although the arrows point directly to the destination of a packet, it should be understood that each packet may be routed through intermediate nodes before reaching its destination. Examples of processor commit points and memory commit points are illustrated in FIGS. 18–29. Examples of ordered transactions as a function of time are illustrated in FIGS. 30–32.

Processor Commit Points/Memory Commit Points

Figure 18:
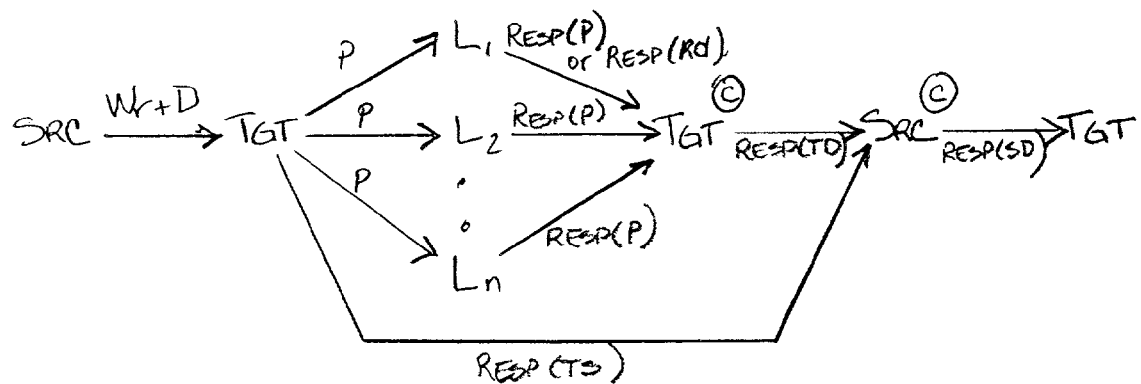
FIG. 18 illustrates an exemplary write transaction directed to coherent memory in the processing subsystem.

FIG. 18 illustrates a Sized Write request to coherent memory in the processing subsystem 12. In FIG. 18, the source of the Sized Write request may be either a processor node or a host bridge. Further, it is assumed that all of the processor nodes in the processing subsystem 12 include a cache, similar to the cache 38 illustrated in FIG. 2.

As illustrated in FIG. 18, the source (SRC) issues a Sized Write request packet and a data packet (Wr+D) to the target (TGT) (e.g., the memory controller owning the address affected by the transaction). Upon receipt of the Write request packet, the target orders it (e.g., queues it in a buffer assigned to the transaction). The target then generates and broadcasts Probe packets (P) to the caches ($L_1 \ldots L_N$) in all the processor nodes (including the source and target nodes) in the processing subsystem 12. In response to the Probe, each processor node examines its cache to determine whether the cache is storing data for the address affected by the transaction, and, if so, then marks that cache line as invalid. Further, if the cache is storing dirty data for an address affected by the transaction, then the processor node returns a Read response (Resp(Rd)) to the target along with (or followed by) a data packet with the dirty data. If the cache does not contain dirty data, then the processor node returns a Probe response (Resp(P)) packet to the target.

Upon receipt of all responses (both Read responses and Probe responses) from the probed nodes, the memory commit point (TGT©) has been reached, and the data (i.e., either the new data or the dirty data from a probed cache) can be written to memory as soon as it is received. In some embodiments, however, if a Read response returns dirty data for a full cache block (e.g., a full 64 bytes), then the target memory controller may write the data to memory without waiting for the probe responses. Further, if a Probe for a partial Sized Write request hits dirty data in a cache, then the data may be written to memory without waiting for all of the Probe responses as soon as the dirty data is available for merging with the partial write data. At this point in the transaction, the data will not be visible to the other nodes in the processing subsystem 12 even though the data already may have been written to memory. Therefore, prior to receipt of the Source Done response and retirement of the buffers assigned to the transaction, the target may not service any other transactions directed to the address to which the data was written.

Once the memory commit point (TGT©) has been reached, the target issues a Target Done response packet (Resp(TD)) to the source of the original request. At this point, the processor commit point (SRC©) (whether in a processor node or a host bridge) has been reached. The source then issues a Source Done response packet (Resp (SD)) back to the target and is free to re-use the source tag that had been assigned to the write transaction. Once the target (i.e., memory controller) receives the Source Done packet, the target allows the data written to memory to be visible to all the processor nodes in the processing subsystem 12. That is, the target is free to service other requests directed to the same address as the write transaction.

In one embodiment, and with reference again to FIG. 18, as part of the sized write transaction, the target optionally may issue a Target Start response packet (Resp(TS)) to the source upon receipt of the Sized Write request from the source. The Target Start response may be used to expedite subsequently issued write transactions, as will be explained in detail below. If a Target Start response is issued, the source will always receive the Target Start response before the Target Done response, because the Target Start response will be issued first and is traveling in the same virtual channel as the Target Done response between the same source and destination. It is noted that if the source has not received the Target Start response prior to receiving the Target Done response, then the Target Start response will not be forthcoming. Thus, the source need not wait for the Target Start response prior to retiring the transaction and re-using the source tag.

In an exemplary embodiment, a memory controller may implement write combining if the memory controller has multiple queued Write requests directed to the same line in memory and no other operations (e.g., Reads, Validate Blocks, etc.) to that line are interleaved between the queued Write requests. If these conditions are satisfied, then the memory controller can combine the Write requests into a single write to memory. In such a situation, Probes need not be issued for any Write requests subsequent to the first write request, because all caches already have been examined and invalidated However, the target still issues a Target Done response for each individual Write request such that the processor commit point may be reached for each request.

Figure 19:
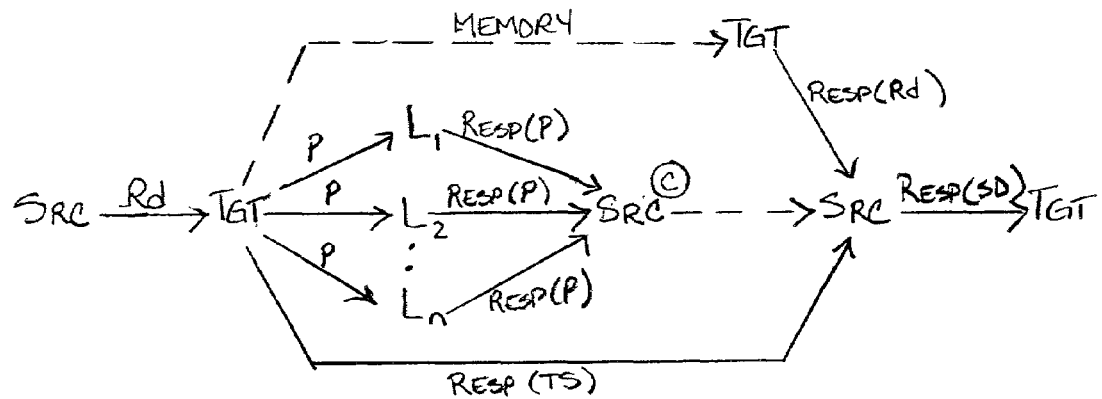
FIG. 19 illustrates an exemplary read transaction directed to coherent memory in the processing subsystem, in which the Probes do not hit dirty data.
Figure 20:
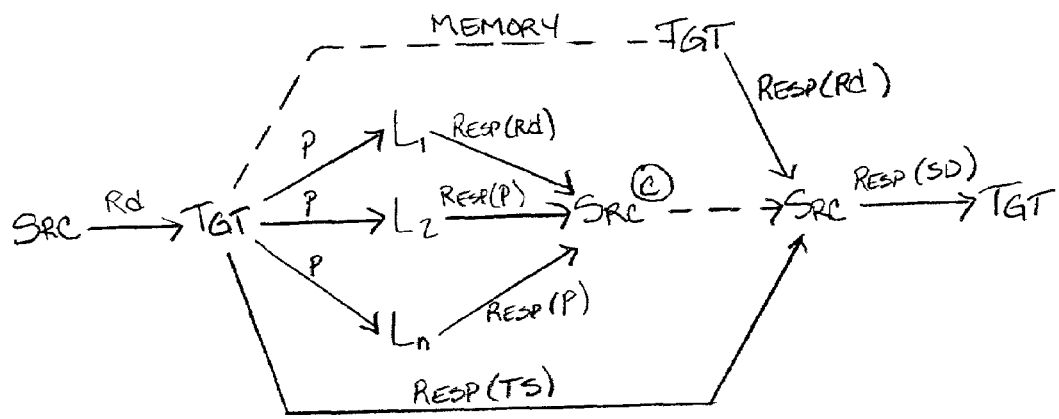
FIG. 20 illustrates an exemplary read transaction directed to coherent memory in the processing subsystem, in which a Probe does hit a dirty cache.
Figure 21:
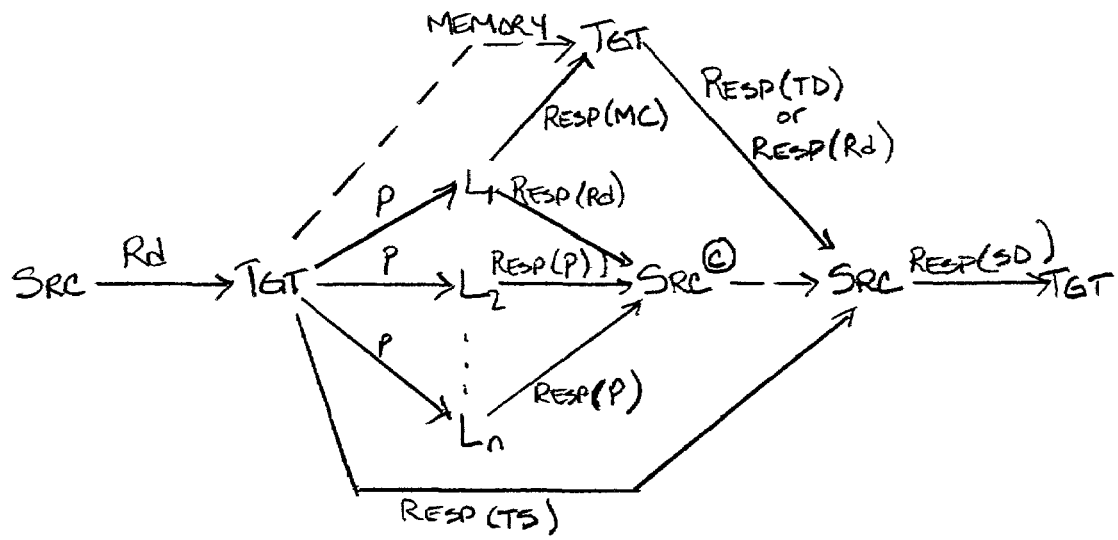
FIG. 21 illustrates an exemplary read transaction directed to coherent memory in the processing subsystem, in which a Probe hits a dirty cache and a Memory Cancel response is issued.

Turning now to FIGS. 19–21, various types of read transactions directed to coherent memory are illustrated. In each of the figures, the read transaction may be either a cache Block Read request or a Sized Read request. In most respects, a Block Read and a Sized Read transaction are substantially similar, except that an optional Target Start response (discussed below) that may be issued in a Sized Read transaction is not issued in a Block Read transaction. Further, Block Reads are used only to transfer cache blocks between processor nodes in the processing subsystem 12 and, thus, are not used for Read requests from the I/O subsystem 14.

FIG. 19 generally illustrates a read transaction directed to coherent memory in which the Probes issued by the target of the read request do not hit dirty data in a cache. The source (SRC) of the transaction may be either a host bridge (HB) or a processor in a processor node. As illustrated in FIG. 19, the source (SRC) issues a Read request packet (RD) directed to the target (TGT) (e.g., the memory controller owning the address affected by the transaction). Upon receipt, the target queues the Read request in a buffer assigned to the transaction. The target then issues the Read request to its memory, which is an internal action as represented by the dashed arrow in FIG. 19, and also issues Probe packets (P) to the caches ($L_1 \ldots L_N$) in all the processor nodes (including the target and source) in the processing subsystem 12.

In response to the Probe, each processor node determines whether its cache is storing data for the address affected by the transaction. If a probe hit occurs, then the node takes the action (e.g., Invalidate, Mark As Shared, etc.) with respect to the hit cache line as indicated by the encoding of the NextState field in the Probe packet. In the transaction illustrated in FIG. 19, none of the caches are storing dirty data, and thus, all of the processor nodes return a Probe response packet (Resp(P)) directed to the source (as indicated by the state of the response bit in the Probe packet). When all of the Probe responses have been received by the source, the processor commit point (SRC©) has been reached. Further, in the transaction illustrated in FIG. 19, once the processor commit point has been reached (i.e., all of the probe responses have been received), the source may use the read data, if it previously has been received or as soon as it is received.

In addition to the issuance of the Probes to the caches, the target issues the Read request to memory. When the memory access (as represented by the dashed arrow) has completed, the target memory controller issues a Read response (Resp (Rd)) directed to the source. Due to the distributed nature of the fabric, the Read response may be received either before or after the source has received all of the Probe responses. If the Read response is received prior to all of the Probe responses, however, the source may not use the read data until it has received all Probe responses (i.e., the processor commit point is reached).

Once the source has received the Read response from the target and all Probe responses from the processor nodes, it directs a Source Done response (Resp(SD)) back to the target. When the target receives the Source Done response, the target removes the Read request from its request queue, and may then start processing another queued request directed to the same address.

FIG. 19 also illustrates the issuance of an optional Target Start response (Resp(TS)) directed from the target to the source of the read transaction. In an exemplary embodiment, the Target Start response may be issued if the read transaction is a Sized Read request issued by a host bridge and directed to coherent memory. The effect of the Target Start response will be discussed below.

Turning now to FIG. 20, a read transaction directed to coherent memory is illustrated in which the Probe hits dirty data in a cache. The transaction is substantially similar to that described above with respect to FIG. 19, with the exception that the processor node having the cache with the dirty data returns a Read response (Resp(Rd)) and the dirty data in response to the Probe instead of a Probe response (Resp(P)). In this exemplary transaction, the processor node owning the cache storing the dirty data does not issue a Memory Cancel response to the target (i.e., the memory controller) and may indicate that a Memory Cancel response has not been issued by clearing the Cancel bit in the Read response packet. The processor commit point (SRC©) is reached when all responses from the probed caches (both Probe responses and the Read response) have been received by the source. When the processor commit point has been reached, the source may use the read data.

When the access to memory represented by the dashed arrow has been completed, the target (i.e., the memory controller) sends a Read response (Resp(Rd)) to the source. When the source has received all the Probe responses and the Read responses from the caches and the target memory controller, it issues a Source Done response (Resp(SD)) back to the target memory controller. Because the source knows from the probed cache's Read response that the Memory Cancel response was never issued, the source clears the Cancel bit in the Source Done packet transmitted to the target memory controller. Once the source has issued the Source Done response, it may re-use the source tag that had been assigned to the read transaction.

Turning now to FIG. 21, a Read request directed to coherent memory in which the Probe response hits a dirty cache and the dirty cache issues a Memory Cancel response to the target memory controller is illustrated. The transaction illustrated in FIG. 21 is substantially similar to the transaction illustrated above in FIG. 20, with the exception that the probed dirty cache ($L_1$) issues a Memory Cancel response (Resp(MC)) to the target memory controller to tell the target memory controller to cancel the access to memory. If the memory access completes without receiving the Memory Cancel response, the target memory controller issues a read response (Resp(Rd)) to the source. If, however, the Memory Cancel response is received before the memory access has completed, the target memory controller cancels the access, issues a Target Done response (Resp(TD)) to the source, and drops any data that had been read from memory The processor commit point (SRC©) is reached when all Probe responses and the Read response from the probed nodes have been received by the source. The source may use the data at this point. The Read response packet informs the source that the processor owning the dirty cache issued a Memory Cancel response to the target memory controller. Thus, when the source has received all of the Probe responses from the probed nodes and the response (either the Target Done or the Read response) from the target memory controller, the source issues a Source Done response (Resp (SD)) to the target memory controller with the Cancel bit set. At this point, the source also may retire any buffers reserved for the transaction and re-use the source tag.

In this transaction, due to the distributed nature of the fabric, the target memory controller may receive the Source Done response (and the source may be re-using the source tag for a new transaction) prior to receiving the Memory Cancel response from the dirty cache. However, because the Cancel bit is set in the Source Done response, the target memory controller is made aware that a Memory Cancel response has been issued. Thus, the target memory controller will not retire the buffer it has reserved for the transaction until it has received the Memory Cancel response. By imposing this wait restriction, the target memory controller will not act on a later-issued transaction which has the same source tag and is directed to the same address and, thus, will not associate the Memory Cancel with the later-issued transaction.

Figure 23:
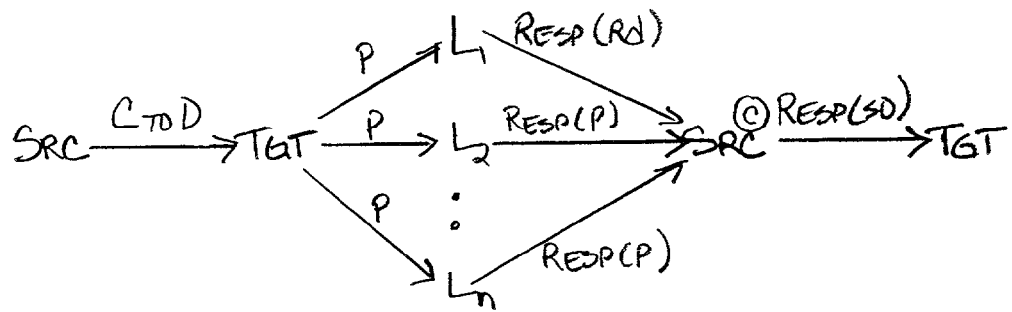
FIG. 23 illustrates an exemplary Change to Dirty transaction in which a Probe does hit dirty data in a cache.
Figure 22:
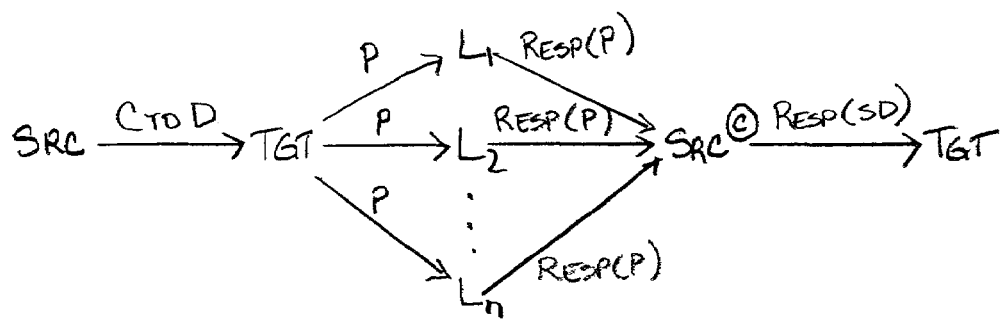
FIG. 22 illustrates an exemplary Change to Dirty transaction in which the Probes do not hit dirty data.

Turning now to FIGS. 22 and 23, two Change To Dirty transactions are illustrated. In the exemplary embodiment, a Change To Dirty request may be directed only to memory and not to any I/O node in the I/O subsystem 14. Further, a Change To Dirty request is generated only by processors in the processing subsystem 12 and not by host bridges.

FIG. 22 illustrates a Change To Dirty transaction in which the Probes broadcast by the target memory controller do not hit a dirty cache. The source (SRC) issues the Change To Dirty request (CtoD) to the target (i.e., the memory controller). After receipt and ordering (i.e., the request is queued) of the Change To Dirty request, the target issues Probes (P) to all of the caches ($L_1 \ldots L_N$) in the processor nodes (including the source and the target) in the processing subsystem 12. Because none of the Probes hits a dirty cache, each of the nodes owning the caches returns a Probe response (Resp(P)) back to the source. Upon receipt of all of the Probe responses, the processor commit point (SRC©) is reached and the source may retire the buffer reserved for the transaction and re-use the source tag. The source also issues a Source Done response (Resp(SD)) back to the target. Upon receipt of the Source Done response, the target may retire its buffer.

FIG. 23 illustrates a Change To Dirty transaction in which one of the Probes hits a dirty cache. This transaction is substantially the same as that illustrated above in FIG. 22, with the exception that the node owning the dirty cache returns a Read response packet (Resp(Rd)) back to the source along with the dirty data. Upon receipt of all of the responses (both the Probe response and the Read response) from the probed nodes, the processor commit point (SRC©) has been reached. The source node caches the dirty data and issues a Source Done response directed to the target. The target may then retire the transaction.

Figure 24:
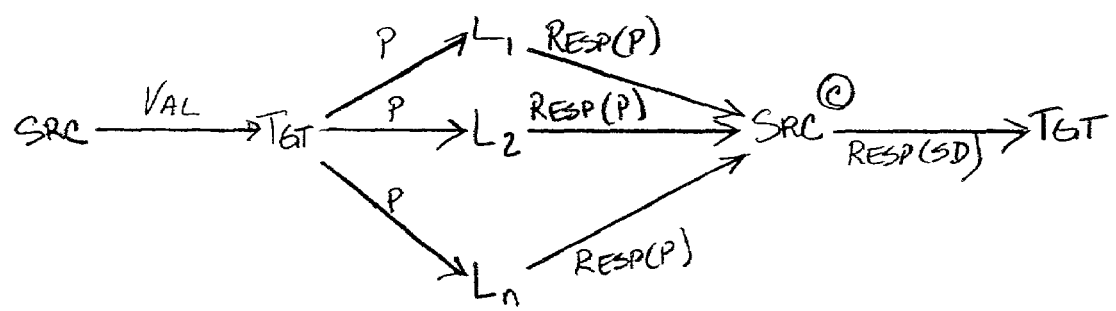
FIG. 24 illustrates an exemplary Validate transaction.

FIG. 24 illustrates a Validate Block request transaction. A Validate Block request is generated only by processor nodes and may be directed only to memory and not to the I/O subsystem 14. The source directs the Validate Block request (VAL) to the target (e.g., the memory controller). In response to the request, the target broadcasts Probes (P) to all of the caches ($L_1 \ldots L_N$). If the probe hits in a cache, then the node owning the hit cache takes the action (i.e., invalidate block) as indicated by the encoding of the Probe packet. Because the transaction is a Validate Block transaction, none of the probed nodes will return data, regardless of whether a probe hit has occurred. Thus, all nodes return a Probe response (Resp(P)) to the source and the requester may now consider itself to own a writeable copy of the cache block. Upon receipt of all Probe responses, the processor commit point (SRC©) is been reached, and the source may retire the transaction and re-use the source tag. The source also issues a Source Done response (Resp(SD)) directed to the target. Upon receipt of the Source Done response, the target may retire the transaction.

Figure 25:
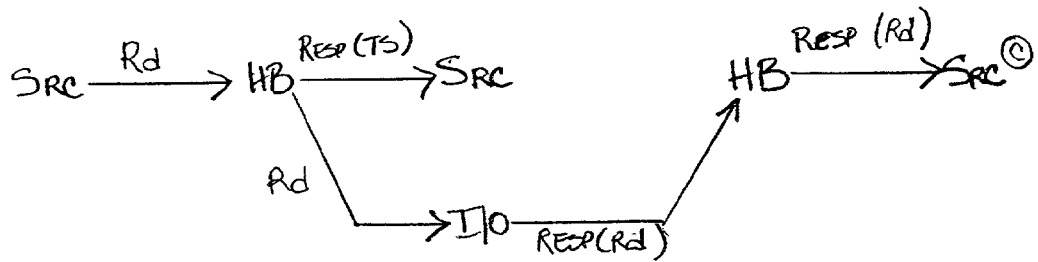
FIG. 25 illustrates an exemplary read transaction issued from the processing subsystem and directed to the I/O subsystem.
Figure 26:
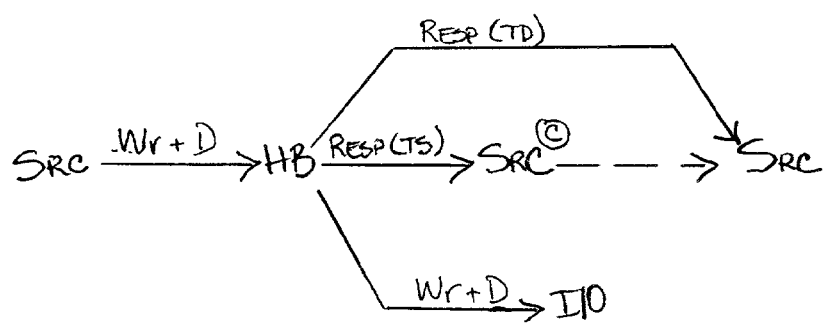
FIG. 26 illustrates an exemplary posted write transaction issued from the processing subsystem and directed to the I/O subsystem.
Figure 27:
FIG. 27 illustrates an exemplary non-posted write transaction issued from the processing subsystem and directed to the I/O subsystem.
Figure 28:
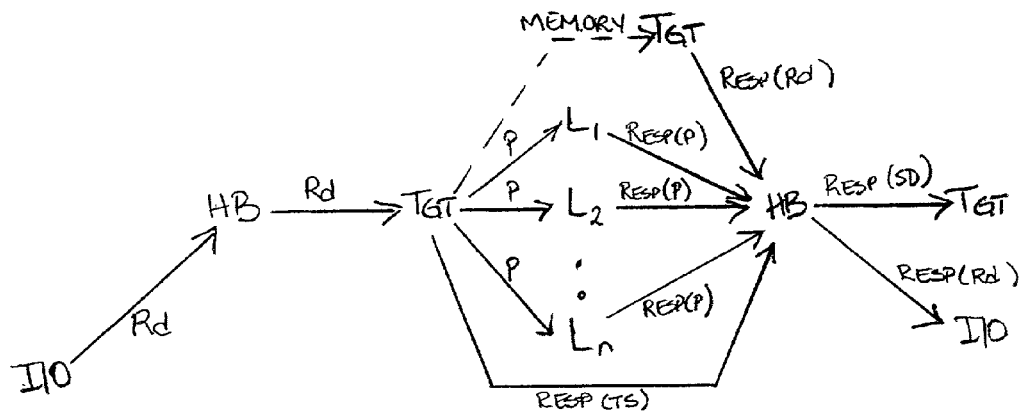
FIG. 28 illustrates an exemplary read transaction issued from the I/O subsystem and directed to memory in the processing subsystem.
Figure 29:
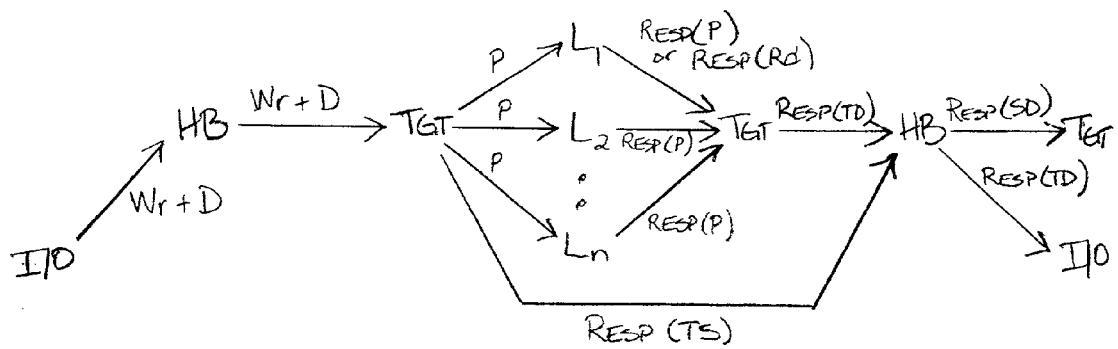
FIG. 29 illustrates an exemplary write transaction issued from the I/O subsystem and directed to memory in the processing subsystem.

FIGS. 25–29 illustrate various transactions which may occur between the coherent and non-coherent fabrics, and, thus, which pass through the host bridge. A transaction passing between the coherent and non-coherent fabrics may be sourced either on the coherent fabric or the non-coherent fabric. FIGS. 25–27 illustrate transactions that are sourced on the coherent fabric, and FIGS. 28 and 29 illustrate transactions that are sourced on the non-coherent fabric.

With reference to FIGS. 25–27, when a transaction is sourced on the coherent fabric, the host bridge translates the transaction to a new transaction which is issued on the non-coherent fabric. From the point of view of the I/O nodes in the non-coherent fabric, the transaction appears to be sourced by the host bridge. Thus, in an embodiment in which all peer-to-peer communications between I/O devices in the I/O subsystem 14 are routed through the host bridge, the transactions illustrated in FIGS. 25–27 also are representative of the second half of a peer-to-peer transaction, in which the source is one of the I/O nodes rather than a processing node in the processing subsystem 12.

When the source is a processing node, the host bridge is responsible for translating coherent packets into non-coherent packets and appropriately managing the routing of packets between the coherent and non-coherent fabrics. Thus, for example, when a host bridge receives a coherent packet directed to a target in the non-coherent fabric, the host bridge translates the packet into a non-coherent packet. The non-coherent packet includes the appropriate addressing to ensure that the non-coherent packet is routed to and accepted by the intended target. Further, the host bridge places its Unit ID (.e.g., "0") in the unit ID field in the packet and assigns a new source tag to the packet. To maintain a record of the original source of the transaction, the host bridge also may implement a tracking table which maps SrcNode-SrcUnit-SrcTag triplets (which identify the original transaction) from the coherent packet to SrcTags on the non-coherent fabric. Such a table also enables the host bridge to translate non-coherent packets (e.g., responses) that are part of the transaction to coherent packets and to ensure that the translated packets are appropriately routed.

With reference to FIG. 25, a read transaction directed to an I/O node from a source (e.g., either a processing node or an I/O node) is illustrated. The read transaction includes a Read request packet (Rd) which is issued from the source (SRC) and directed to a target (I/O) in the I/O subsystem 14. The host bridge (HB) that is connected to the targeted I/O node receives the Read request packet, translates it to a new Read request packet (Rd), and routes the packet onto the non-coherent fabric. If the Read request was sourced on the coherent fabric, then the translation includes generating a non-coherent packet corresponding to the coherent Read request packet. In some embodiments, the host bridge also may return a Target Start response (Resp(TS)) to the source as soon as the Read request is received and queued, as will be discussed below.

When the read request is received by the targeted I/O node, the I/O node returns a non-coherent Read response (Resp(Rd)) which is routed to the host bridge. If the transaction was sourced on the coherent fabric, then the host bridge generates a coherent Read response packet using the SrcNode-SrcUnit-SrcTag information stored in the tracking table and issues the coherent packet onto the coherent fabric. If the transaction was sourced on the non-coherent fabric, then the host bridge generates a new non-coherent Read response packet (e.g., places the Unit ID of the I/O node to which the response is directed into the UnitID field) and issues it back onto the non-coherent fabric (not shown). The processor commit point (SRC©) is reached when the source receives the response, at which time the source may retire the transaction and re-use the source tag.

FIGS. 26 and 27 illustrate write transactions directed to the non-coherent fabric. A write transaction may be either a posted write transaction or a non-posted write transaction, as indicated by the contents of the Write request packet. The source of the transaction determines whether the transaction should be posted or non-posted, based on the requirements of both the source and the region being accessed. FIG. 26 illustrates a posted write transaction, and FIG. 27 illustrates a non-posted write transaction.

With reference first to FIG. 26, a source (SRC) (e.g., a processor, an I/O node) issues a posted Write request packet and a write data packet (Wr+D) which is routed to the host bridge (HB) connected to the targeted I/O node (I/O). When the request packet is received and queued, the host bridge may return both a Target Start response (Resp(TS)) and a Target Done response (Resp(TD)) back to the source. In the exemplary embodiment, both the Target Done response and the Target Start response travel in the same virtual channel. Thus, if the Target Start response is issued prior to the Target Done response, the Target Start response is guaranteed to reach the source first. However, because the Target Done response may be issued as early as the Target Start response, the Target Start response is redundant, and receipt of either the Target Start response or the Target Done response by the source is sufficient to establish the processor commit point (SRC©).

In addition to the Target Start and Target Done responses, the host bridge issues a new Write request packet and data packet (Wr+D) onto the non-coherent fabric, which are received by the targeted I/O node (I/O). Because the Write request is a posted write, and, thus, considered complete by the source when the request is issued, the targeted I/O node does not generate a response when the request and data are received.

The transaction illustrated in FIG. 27 is a non-posted write transaction in which the source (SRC) (e.g., a processor, an I/O node) issues a non-posted Write request and data (Wr +D) which are received by the host bridge (HB) connected to the targeted I/O node (I/O). After receipt and ordering of the request, the host bridge may issue a Target Start response (Resp(TS)) directed back to the source. The host bridge also issues a new non-posted Write request and data (Wr+D) onto the non-coherent link which is addressed for receipt by the target (I/O). Upon receipt of the Write request, the target issues a Target Done response (Resp(TD)) which is transmitted to the host bridge. The host bridge then transmits a Target Done response directed back to the source. The processor commit point (SRC©) is reached when the source receives the Target Done response, at which time the source may retire the transaction and re-use the source tag.

FIGS. 28 and 29 illustrate transactions generated on the non-coherent fabric, which are passed through to the coherent fabric. When the non-coherent request is received by the host bridge, the host bridge translates the request into a new coherent request which is issued onto the coherent fabric. Translation includes placing the NodeID and UnitID of the target into the DestNode and DestUnit fields of the coherent packet, placing the NodeID and UnitID of the host bridge into the SrcNode and SrcUnit fields of the packet, and placing a new source tag into the SrcTag field. As discussed above, the host bridge keeps track of the transaction by maintaining a tracking table which maps SrcTags on the coherent fabric to SrcUnit-SrcTag pairs on the non-coherent fabric. If ordering requirements exist between the new transaction and a previously issued transaction, the host bridge is responsible for maintaining the ordering by adhering to the wait requirements set forth in table 56 of FIG. 11.

FIG. 28 illustrates a sized read transaction that is generated by an I/O node and directed to coherent memory. A non-coherent Read request (Rd) is generated by a source (e.g., an I/O node) (I/O) and received by the host bridge (HB). The host bridge translates the non-coherent Read request into a coherent Read request (Rd) and issues it onto the coherent fabric directed to the target (e.g., a memory controller) (TGT). Upon receipt of the Read request, the target broadcasts Probes (P) to the caches ($L_1 \ldots L_N$) in all of the processing nodes in the processing subsystem 12. The target also delivers the Read request internally to memory (as indicated by the dashed arrow). When the access to memory has completed, the target issues a Read response (Resp(Rd)) with the read data back to the host bridge. If the probes do not hit dirty data in a cache, then the probed caches all return Probe responses (Resp(P)) to the host bridge as indicated in FIG. 28. However, if a dirty hit occurs, then the cache owning the dirty data will return a Read response and the dirty data (not shown). When the host bridge has received all responses from the caches and the target, then the host bridge issues a Source Done response back to the target and transmits the Read response and data to the source I/O node.

If the Probe does not hit dirty (i.e., a clean snoop), then the host bridge must wait for all responses before it may issue the Read response received from memory to the requesting I/O node. If the probe does hit dirty, then the host bridge may forward the dirty data to the requesting I/O node as soon as the dirty data is received from the cache.

In the read transaction illustrated in FIG. 28, the target also may issue a Target Start response (Resp(TS)) back to the host bridge when the target receives the read request. If the Target Start response is issued, it is sent prior to broadcasting the Probes and performing the access to memory. The effect of the Target Start response will be discussed below.

FIG. 29 illustrates a sized write transaction generated by an I/O node and directed to coherent memory. The write transaction may be either a posted transaction or a non-posted transaction. If the transaction is a posted write, then the transaction is considered complete on the non-coherent fabric as soon as the I/O node issues the Write request to the host bridge. The I/O node is then free to retire any buffers reserved for the transaction and re-use the source tag. If the transaction is a non-posted write, then the transaction is not considered complete on the non-coherent fabric until the I/O node receives a Target Done response, as will be discussed below.

For both non-posted and posted write transactions, the host bridge translates the non-coherent request to a coherent request and directs the new Write request and data onto the coherent fabric to the target (e.g., memory controller). Upon receipt of the Write request, the target broadcasts Probes to all caches ($L_1 \ldots L_N$) in the processing subsystem 12. If the probes do not hit dirty data, then the probed caches return Probe responses (Resp(P)) to the target. If a Probe does hit dirty data, then the dirty cache returns a Read response (Resp(Rd)) and the dirty data to the target. Once all responses (both Probe responses and Read responses) have been received by the target, the memory commit point (TGT©) has been reached and the data may be written to memory. The target memory controller also issues a Target Done response (Resp(TD)) back to the host bridge and the host bridge returns a Source Done response (Resp(SD)) back to the target memory controller. Upon receipt of the Source Done response, the target may retire the transaction. If the original transaction was a nonposted write request, then the host bridge also sends a non-coherent Target Done response to the I/O node. Upon receipt of the Target Done response, the I/O node may retire the transaction and issue any new transactions directed to the same address.

In the transaction illustrated in FIG. 29, the target also may issue the optional Target Start response (Resp(TS)) back to the host bridge after the Write request has been received and ordered.

Examples of Ordered Transactions and Target Start

Use of the Target Start response may improve the bandwidth of transactions sourced on the non-coherent fabric that are directed to coherent memory. Many types of I/O subsystems (e.g., PCI) require that certain ordering protocols be followed with respect to transactions directed to memory. Thus, the protocol enforced in the I/O subsystem will assure that requests traveling in an I/O stream to the host bridge will remain in whatever order may be dictated by the particular system. For example, PCI systems require that a write request must push any prior write requests and read requests ahead of it in the I/O stream. The ordering of the transactions must be maintained after the transactions are issued onto the coherent fabric. However, due to the distributed nature of the coherent fabric, there can be no guarantee that a prior transaction will reach its target and complete before a subsequent transactions reaches its target and completes. Thus, the wait restrictions discussed above may be imposed on the host bridge to ensure that a subsequent transaction is not issued until a previously issued transaction has progressed far enough in the coherent fabric that the previously issued transaction will be guaranteed to be complete first.

For example, if the host bridge issues a first write transaction to a first location A (Wr(A)) and then a second write transaction to a second location B (Wr(B)) on the coherent fabric, it must not be possible for any observer in the coherent fabric to read the results of the second write transaction but not the results of the first write transaction. That is, if a Read request directed to location B (Rd(B)) returns new data, then a Read request directed to location A (Rd(A)) also must return new data. Location A and location B may be at two different nodes in the coherent fabric, and thus, any requests to locations A and B are not guaranteed to be received in the same order in which they were issued. Moreover, because data corresponding to locations A and B may be cached in any device in the coherent fabric, all copies of data A (which is old data) should be invalidated before allowing any processor to see new data in location B.

Maintaining the proper ordering of the first Write request to location A with respect to the second Write request to location B may be ensured by imposing a wait requirement on the host bridge that causes the host bridge to stall the second Write request to location B until the host bridge receives confirmation that the first Write request to location A has completed (i.e., all copies of data corresponding to location A have been invalidated, and the target of the first Write request to A has the only valid copy of the data). Thus, with reference to the transaction illustrated in FIG. 30, before issuing the second Write request to location B, the host bridge (SRC) must wait until the first Write request to location A reaches the target, the target has broadcast Probes requests to all caches, the caches have invalidated any copies of data corresponding to location A and issued responses back to the target, and the target has issued a confirmation (e.g., the Target Done response) after receiving all responses. After the host bridge has received confirmation (e.g., the Target Done response) that the first Write request to location A has completed at the target, the host bridge may then issue the second Write request directed to location B onto the coherent fabric.

This approach to write ordering introduces potentially lengthy delays between the time the Write request to location A is issued and the time that the Write request to location B may be issued. If this time delay is considered the "write completion" time, then the write bandwidth of an ordered stream of I/O traffic flowing through the host bridge onto the coherent fabric may be expressed as:

$$\frac{\text{packet size}}{\text{write completion time}}$$

In the exemplary embodiment, the wait requirements imposed on various devices (e.g., the source, the host bridge, the target, etc.) stall subsequent transactions only as long as needed to ensure that a subsequent transaction will be properly ordered with respect to a previously issued transaction, thus improving the write bandwidth. As discussed above, the wait requirements are implemented by a communication protocol which includes various responses that are issued as part of a particular transaction. Thus, before devices may proceed with certain actions (e.g., committing data to memory, re-using a source tag, retiring a transaction, completing a transaction, issuing a new transaction, etc.), the devices wait for a response indicating that a previous transaction has proceeded to a point at which the device may now safely take the action with respect to a subsequent transaction.

The following examples of ordered transactions presented in FIGS. 31 and 32 illustrate the manner in which the Target Start response improves the write bandwidth for ordered write transactions sourced on the non-coherent fabric and directed toward the coherent fabric. In each of the examples, the transactions are issued from the I/O subsystem and are directed to coherent memory. The figures illustrate the coherent side of the transaction and, thus, the source is the host bridge connected to the I/O subsystem which generated the request and the target is a memory controller on the coherent fabric. It should be understood however, that in other types of systems which require transactional ordering or which could benefit from improved bandwidth, the source and the target may be any device on a coherent communication fabric.

FIG. 31 illustrates an ordered pair of write transactions as a function of time. The source (SRC) (e.g., a host bridge) first issues the first Write request (Wr(A)) directed to a target A (e.g., a memory controller). As soon as Wr(A) is received by the target A and ordered (i.e., meaning that no other requests directed to the location A may pass Wr(A)), the target issues a Target Start response (Resp(TS)) back to the source. When the source receives the Target Start response, it may issue the second Write request (Wr(B)) directed to target B (e.g., a memory controller). Upon receipt of the Write requests Wr(A) and Wr(B), targets A and B each issues Probes (P) for the appropriate address to all the caches (L1 . . . LN) in all nodes in the processing subsystem 12. Upon receipt of the Probes, the caches are invalidated as appropriate, and Probe responses (Resp(P)) are returned to the targets A and B. Targets A and B each collect their Probe responses and, when all have been received (i.e., the memory commit point has been reached), issue a Target Done response (Resp(TD)) back to the source (e.g., the host bridge). However, due to the distributed nature of the fabric and because two different targets are involved, it is unknown whether target A or target B will be the first to issue the Target Done response.

When the source receives the Target Done response from target A, the source issues a Source Done response (Resp (SD)) back to target A, thus allowing the first write transaction to location A to complete (i.e., target A may retire the transaction buffer). However, the source may not issue a Source Done response back to target B (thus allowing the second write transaction to location B to complete) until both Target Done responses from targets A and B have been received. By waiting for both Target Done responses, it can be guaranteed that at the time the source allows the second write transaction to location B to complete, all copies of location A have been invalidated.

Thus, the wait requirements delay visibility of the results of the second write only until the memory commit point for the first transaction has been reached and the source has received a Target Done response from the target A indicating that all Probes for the first transaction have been received and any copies of data affected by the first transaction have been invalidated. When the source receives confirmation of these events (i.e., in the form of the Target Done response), the source may allow the second write transaction to complete. That is, the source may issue a Source Done response directed to target B which allows the target B to retire the second transaction, thus making the results of the second write transaction visible to the other nodes in the coherent fabric.

The Target Start response accelerates completion of the second write transaction. That is, to ensure ordering is maintained between the first and second write transactions, issuance of the second write transaction need be delayed only until it is guaranteed that the first write transaction has been received and ordered at its target. Thus, once the Write request is received and ordered (e.g., queued so that no other transaction to the same location can pass it) at its target, the target may issue a Target Start response back to the source, which allows the source to issue the second write transaction.

As a result, execution of portions of the second write transaction may overlap execution of the first write transaction, thus allowing write transactions to be issued at a higher rate than may be achieved simply by stalling transactions until a previous transaction completes. As illustrated in FIG. 31, issuance of the second write transaction (Wr(B)) is stalled only by the amount of time needed to transmit the first write request to the target and to receive a returned Target Start response acknowledging receipt and ordering of the request. If this amount of time is termed the "write acknowledge time," the improved write bandwidth may be expressed as follows:

$$\frac{\text{packet size}}{\text{write acknowledge time}}$$

Thus, the new write bandwidth may present a significant improvement over the bandwidth previously achievable.

This same improvement in bandwidth also is evident in the transaction example in FIG. 32, illustrating the ordering of a read transaction with respect to a previously issued write transaction as a function of time. In this example, the ordering protocol imposed by the I/O subsystem requires that a read transaction must push any previous write transactions that are ahead of it in the I/O stream. Thus, the ordered behavior that must be attained is that the read transaction should not appear to complete until all previously issued write transactions have completed.

Accordingly, with reference to FIG. 32, the source (SRC) (e.g., a host bridge) issues a Write request (Wr(A)) directed to target A (e.g., a memory controller). As soon as the Write request is received and ordered by target A, target A issues a Target Start response (Resp(TS)) back to the source. When the source receives the Target Start response, the source issues a Read request (Rd(B)) directed to target B (e.g., a memory controller) which, when received, is ordered within the target B. Each of targets A and B issue Probes (P) for the appropriate address to all caches ($L_1 \ldots L_N$) in the processing subsystem 12. The caches may invalidate the appropriate entries in response to the Probes (if needed) and issue Probe responses (Resp(P)) back to the appropriate target. Each of targets A and B collect their Probe responses and, when all have been received, issue Target Done responses Resp(TD)) back to the source.

As discussed above with respect to FIG. 31, the source may receive the Target Done responses in any order. When the Target Done response from target A is received, the source issues a Source Done response back to target A, and the write transaction is complete. However, the source may not issue a Source Done response for the read transaction or forward a Read response for the read transaction or the read data to the I/O subsystem 14 until the Target Done responses for both the write transaction and the read transaction have been received by the source.

The desired ordered behavior thus is attained with minimal delay. The read transaction is not issued until the source receives the Target Start response, indicating that the prior write transaction has been received and ordered at its target. Thus, execution of portions of the read transaction may overlap the write transaction. However, the delay that is imposed between issuance of the write and read transactions ensures that the read transaction will be ordered behind any previously issued write transactions. Further, delaying issuance of the read data to the I/O subsystem until the Target Done responses for both the write transaction and the read transaction are received by the source ensures that all observers will have seen any new write data before the read transaction can be completed.

It should be understood that the ordered transaction examples described above are only two types of ordered transactions that may occur. Further examples of ordered transactions and their corresponding wait requirements are provided in table 56 of FIG. 11, as discussed above. The ordering protocol described, which involves wait requirements for particular types of responses, is intended to apply to any type of ordered transaction. Further, the Target Start response also may be used in various other types of ordered transactions to improve the efficiency of the issuance of transactions.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of maintaining order of transactions in a distributed communication system, the distributed communication system comprising a plurality of nodes interconnected by a plurality of communication links, the plurality of nodes having access to a plurality of addressable memory locations, the plurality of nodes comprising a source node and a target node, the method comprising the acts of:

dispatching, by the source node, a first request directed to a first memory address accessible by the target node;

transmitting, from the target node, a first response directed to the source node in response to the first request;

transmitting, from the source node, a second response directed to the target node after receipt of the first response;

stalling service, by the target node, of a second request directed to the first memory address pending receipt of the second response; and issuing, by the target node, a probe in response to the first request, the probe being directed to each of the plurality of nodes to determine whether any of the plurality of nodes is caching data corresponding with the first memory address; and issuing, by each of the plurality of nodes, a third response in response to the probe, wherein act of transmitting the second response, from the source node, is performed after receipt of all of the third responses; and wherein each of the third responses is directed to the target node, and wherein the act of transmitting the first response directed to the source node is performed after receipt of all of the third responses by the target node.

2. The method as recited in claim 1, wherein the first request is associated with a first transaction, and the act of transmitting the first response is performed after the first transaction has reached a memory commit point.

3. The method as recited in claim 2, wherein the act of transmitting the second response is performed after the first transaction has reached a processor commit point.

4. The method as recited in claim 2 wherein the first transaction is a write transaction, wherein the first response is a Target Done response, and wherein the second response is a Source Done response.

5. The method as recited in claim 1, wherein the first request comprises a read request, and wherein the first response comprises a read response.

6. The method as recited in claim 1, wherein the first request is associated with a first transaction, and the method comprises the act of:

stalling, by the source node, dispatch of a second transaction pending receipt of the first response.

7. The method as recited in claim 1, wherein each of the third responses is directed to the source node.

8. The method as recited in claim 1, wherein one of the third responses is a read response, the read response indicating that the node which issued the read response is storing data corresponding to the first memory address.

9. The method as recited in claim 1, wherein the source node comprises a processor.

10. The method as recited in claim 1, wherein the source node comprises a host bridge.

11. The method as recited in claim 1, wherein the target node comprises a memory controller configured to access the first memory address.

12. A method of maintaining order of transactions issued in a distributed communication system, the distributed communication system comprising a plurality of nodes interconnected by a plurality of communication links, the plurality of nodes configured to access a plurality of addressable memory locations for storing data, the plurality of nodes comprising a source node and a target node, the method comprising the acts of:

storing at the target node a first request received from the source node and directed to a first memory address;

storing at the target node a second request directed to the first memory address;

servicing the first request;

transmitting a communication to the source node in response to the act of servicing the first request;

stalling an act of servicing the second request pending receipt by the target node of a source response transmitted from the source node in response to the communication;

wherein the acts of storing the first request and the second request at the target node comprises the act of ordering the first request and the second request in a queue in the order in which the first request and the second request were received;

wherein the first request comprises a read request, and wherein the communication transmitted to the source node comprises a plurality of responses issued from the plurality of nodes;

wherein the plurality of responses comprises a memory access response issued from the target node, and wherein the act of servicing the first request comprises the acts of:

accessing, by the target node, a memory location associated with the first memory address;

transmitting to the source node the memory access response based on the act of accessing by the target node; and determining whether data corresponding to the first memory address is cached at any of the plurality of nodes;

wherein the plurality of responses comprises a plurality of cache responses issued by the plurality of nodes, and wherein the act of determining whether data corresponding to the first memory address is cached at any of the plurality of nodes comprises the acts of:

issuing a probe directed to each of the plurality of nodes; and issuing, by each of the plurality of nodes, one of the cache responses in response to the probe, each of the cache responses being directed to the source node; and wherein if a first node of the plurality nodes is caching data corresponding to the first memory address, the method comprises the acts of:

issuing, by the first node, a memory cancel response directed to the target node; and formatting the cache response issued from the first node to indicate the act of issuing the memory cancel response.

13. The method as recited in claim 12, wherein the first request comprises a write request, and wherein the act of transmitting the communication to the source node is performed when the act of servicing the write request has reached a memory commit point.

14. The method as recited in claim 13, wherein the communication comprises a Target Done response, and wherein the method comprises the act of generating the Target Done response by the target node.

15. The method as recited in claim 13, wherein the act of servicing the first request comprises the act of determining whether data corresponding to the first memory address is cached at any of the plurality of nodes.

16. The method as recited in claim 15, wherein the act of serving the first request has reached the memory commit point when the act of determining whether data corresponding to the first memory address is cached at any of the plurality of nodes is complete.

17. The method as recited in claim 15, wherein the act of determining whether data corresponding to the first memory address is cached at any of the plurality of nodes comprises the acts of:
  issuing a probe directed to each of the plurality of nodes; and
  issuing, by each of the plurality of nodes, a cache response in response to the probe, each cache response being directed to the target node and indicating whether data corresponding to the first memory address is cached at the particular node.

18. The method as recited in claim 17, wherein the memory commit point is reached when all of the cache responses have been received by the target node.

19. The method as recited in claim 12, comprising the act of canceling the act of accessing the memory location in response to the memory cancel response.

20. The method as recited in claim 12, comprising the act of:
  formatting the source response to indicate the act of issuing the memory cancel response; and
  wherein the act of stalling service of the second request is stalled pending receipt of the memory cancel response by the target node.

21. A communication node for a distributed communication system comprising a plurality of communication nodes interconnected by a plurality of communication links, the node comprising:
  a memory controller to control access to a memory, the memory comprising a plurality of memory locations corresponding to a plurality of memory addresses;
  an interface configured to connect to a communication link; and
  communication logic coupled to the memory controller, and the interface, wherein the communication logic is configured to:
    store a first request received from a source via the interface, the first communication being directed to a first memory address of the plurality of memory addresses;
    store a second communication directed to the first memory address;
    generate a first response directed to the source in response to the first request; and
    stall the second request pending receipt from the source of a second response in response to the first response;
  wherein the communication logic is configured to generate a probe for transmission to each of the plurality of communication nodes in the distributed communication system, the probe to determine whether data corresponding to the first memory address is cached at any of the plurality of communication nodes;
  wherein the first request comprises a read request, and wherein, the communication logic is configured to issue the read request to the memory controller to access the memory location corresponding to the first memory address;
  wherein the communication logic is configured to cancel the access by the memory controller to the memory location in response to a memory cancel response received from a particular communication node of the plurality of communication nodes, the memory cancel response indicating that the particular communication node is caching data corresponding to the first memory address.

22. The communication node as recited in claim 21, comprising:
  a processor; and
  a cache to store data, the cache being coupled to the processor and the communication logic; and
  wherein the communication logic comprises a buffer configured to store the first request and the second request in the order received.

23. The communication node as recited in claim 21, wherein the first request comprises a write request, and wherein the communication logic is configured to receive a plurality of cache responses in response to the probe, each cache response indicating whether data corresponding to the first memory address is cached at a particular communication node of the plurality of communication nodes in the distributed communication system.

24. The communication node as recited in claim 23, wherein the communication logic is configured to generate the first response directed to the source when all of the plurality of cache responses to the probe have been received.

25. The communication node as recited in claim 24, wherein the first response comprises a Target Done response.

26. The communication node as recited in claim 21, wherein the first response comprises a read response in response to the access to the memory location.

27. The communication node as recited in claim 21, wherein the communication logic is configured to:
  determine, based on the second response received from the source, whether the memory cancel response was issued; and
  stall the second request pending receipt of the memory cancel response.

28. The communication node as recited in claim 21, wherein the second response comprises a Source Done response.

29. The communication node as recited in claim 21, wherein the communication logic comprises packet-based communication logic.

30. A distributed communication system, comprising:
  a plurality of nodes, the plurality of nodes comprising a source node and a target node;
  a plurality of communication links interconnecting the plurality of nodes; and
  a memory accessible by the plurality of nodes, the memory comprising a plurality of memory locations corresponding to a plurality of memory addresses, wherein each of the plurality of nodes is configured to control access to a portion of the memory locations;
  wherein the source node is configured to dispatch a first request directed to a first memory address accessible by the target node;
  wherein the target node is configured to transmit a first response to the source node in response to the first request;
  wherein the source node is configured to transmit a second response to the target node in response to the first response; and
  wherein the target node is configured to stall service of a second request directed to the first memory address pending receipt of the second response;
  wherein each of the plurality of nodes comprises a cache to store data, and wherein the target node is configured to issue a probe in response to the first request, the target node directing the probe to each of the plurality of nodes to determine whether data corresponding to the first memory address is stored in the cache of any of the plurality of nodes, and wherein each of the plurality of nodes is configured to issue a cache response in response to the probe, the cache response indicating whether data is stored in the cache of the respective node;

wherein the first request comprises a read request, and wherein a first node of the plurality of nodes is configured to issue a memory cancel response directed to the target node if the first node is storing data corresponding to the first memory address in its cache;

wherein the first node is configured to format the respective cache response to indicate that the first node has issued the memory cancel response;

wherein the source node is configured to format the second response to indicate issuance of the memory cancel response based on the cache response; and wherein, in response to the second response, the target node is configured to stall the second request pending receipt of the memory cancel response.

31. The system as recited in claim 30, wherein the first request is associated with a first transaction, and wherein the source node is configured to stall dispatch of a second transaction pending receipt of the first response.

32. The system as recited in claim 30, wherein the first request comprises a write request, and wherein the target node is configured to transmit the first response when the first request reaches a memory commit point.

33. The system as recited in claim 30, wherein the target node is configured to format the probe, based on the first request, such that the probe identifies a destination for the plurality of cache response.

34. The system as recited in claim 33, wherein the target node formats the probe to identify the target node as the destination if the first request comprises a write request.

35. The system as recited in claim 33, wherein the target node formats the probe to identify the source node as the destination if the first request comprises a read request.

36. The system as recited in claim 35, wherein if the first request comprises a read request, the target node issues the first response directed to the source node after all of the cache responses are received by the target node.

37. The system as recited in claim 34, wherein if the first request comprises a write request, the source node issues the second response directed to the target node after all of the caches responses and the first response are received by the source node.

38. The system as recited in claim 30, wherein the target node is configured to cancel the access to the memory location corresponding to the first memory address in response to the memory cancel response.

39. The system as recited in claim 30, wherein the source node comprises a host bridge.

40. A method of maintaining order of transactions in a distributed communication system, the distributed communication system comprising a plurality of nodes interconnected by a plurality of communication links, the plurality of nodes having access to a plurality of addressable memory locations, the plurality of nodes comprising a source node and a target node, the method comprising the acts of:

dispatching, by the source node, a first request directed to a first memory address accessible by the target node;

transmitting, from the target node, a first response directed to the source node in response to the first request;

transmitting, from the source node, a second response directed to the target node after receipt of the first response; and stalling service, by the target node, of a second request directed to the first memory address pending receipt of the second response;

issuing, by the target node, a probe in response to the first request, the probe being directed to each of the plurality of nodes to determine whether any of the plurality of nodes is caching data corresponding with the first memory address; and issuing, by each of the plurality of nodes, a third response in response to the probe, wherein act of transmitting the second response, from the source node, is performed after receipt of all of the third responses;

wherein the first request comprises a read request, and wherein if the probe determines that a first node of the plurality of nodes is caching data corresponding to the first address, then the method comprises the act of: issuing, by the first node, a memory cancel response directed to the target node to cancel a memory access by the target node to the first memory address.

41. The method as recited in claim 40, comprising the acts of: canceling the memory access; and issuing by the target node a target done response directed to the source node in response to the memory cancel response.

42. The method as recited in claim 40, wherein the act of issuing the third response by the first node in response to the probe comprises the acts of:

formatting the third response to indicate the issuance of the memory cancel response by the first node; and formatting the second response to indicate the issuance of the memory cancel response.

43. The method as recited in claim 40, wherein the act of stalling service of the second request comprises stalling service pending receipt of the memory cancel response by the target node.

* * * * *